(12) United States Patent
Alexander et al.

(10) Patent No.: US 11,199,235 B2
(45) Date of Patent: Dec. 14, 2021

(54) MULTILAYER DAMPING MATERIAL

(71) Applicant: 3M INNOVATIVE PROPERTIES COMPANY, St. Paul, MN (US)

(72) Inventors: Jonathan H. Alexander, Roseville, MN (US); Georg Eichhorn, Herford (DE); Ronald W. Gerdes, St. Paul, MN (US); Thomas P. Hanschen, Mendota Heights, MN (US); Thomas Herdtie, Inver Grove Heights, MN (US); Taewook Yoo, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 439 days.

(21) Appl. No.: 15/575,152

(22) PCT Filed: Jun. 15, 2016

(86) PCT No.: PCT/US2016/037608
§ 371 (c)(1),
(2) Date: Nov. 17, 2017

(87) PCT Pub. No.: WO2016/205357
PCT Pub. Date: Dec. 22, 2016

(65) Prior Publication Data
US 2018/0156296 A1     Jun. 7, 2018

Related U.S. Application Data

(60) Provisional application No. 62/175,638, filed on Jun. 15, 2015.

(51) Int. Cl.
*F16F 9/30*     (2006.01)
*F16F 1/373*    (2006.01)
(Continued)

(52) U.S. Cl.
CPC .............. *F16F 9/306* (2013.01); *B32B 3/266* (2013.01); *B32B 3/30* (2013.01); *B32B 7/12* (2013.01);
(Continued)

(58) Field of Classification Search
CPC ................................ F16F 9/306; B32B 3/085
See application file for complete search history.

(56) References Cited

U.S. PATENT DOCUMENTS 2,069,413 A      2/1937   Leadbetter
4,741,945 A  *   5/1988   Brant ..................... B32B 5/18
                                                    428/158

(Continued)

FOREIGN PATENT DOCUMENTS

CA        2115890        10/1994
CN     203770498 U        4/2014
(Continued)

OTHER PUBLICATIONS

Proceedings of SPIE vol. 3989 (2000) • p. 132, "An analytical model for a one-dimensional slotted stand-off layer damping treatment", University of Washington; Seattle, WA, pp. 132-141.

(Continued)

*Primary Examiner* — Ramsey Zacharia
(74) *Attorney, Agent, or Firm* — Philip P. Soo

(57) ABSTRACT

A multilayer damping material for damping a vibrating surface comprising: at least one constraining layer; at least one dissipating layer; and at least one kinetic spacer layer comprising multiple spacer elements. The kinetic spacer layer is arranged between the constraining layer and the vibrating surface, when used for damping the vibrating surface. Each spacer element has opposite ends. At least one end of each of the multiple spacer elements is embedded in, bonded to, in contact with, or in close proximity to the (Continued)

dissipating layer, such that energy is dissipated within the multilayer damping material, through movement of the at least one end of each of the multiple spacer elements.

17 Claims, 14 Drawing Sheets

(51) Int. Cl.
| | |
|---|---|
| *B32B 3/26* | (2006.01) |
| *B32B 7/12* | (2006.01) |
| *B32B 3/30* | (2006.01) |
| *B32B 15/085* | (2006.01) |
| *B32B 15/20* | (2006.01) |
| *B60R 13/08* | (2006.01) |
| *B60R 13/02* | (2006.01) |
| *B62D 25/20* | (2006.01) |

(52) U.S. Cl.
CPC ............ *B32B 15/085* (2013.01); *B32B 15/20* (2013.01); *B60R 13/0815* (2013.01); *F16F 1/3737* (2013.01); *B32B 2307/102* (2013.01); *B60R 13/0212* (2013.01); *B60R 13/0243* (2013.01); *B60R 13/0256* (2013.01); *B62D 25/20* (2013.01); *F16F 2226/042* (2013.01); *F16F 2234/06* (2013.01)

(56) References Cited

U.S. PATENT DOCUMENTS

| | | | |
|---|---|---|---|
| 5,108,802 A | | 4/1992 | Sattinger |
| 5,186,996 A | * | 2/1993 | Alts .......................... B32B 5/22 428/72 |
| 5,710,396 A | | 1/1998 | Rogers |
| 5,725,931 A | | 3/1998 | Landin |
| 5,792,411 A | | 8/1998 | Morris |
| 6,007,890 A | | 12/1999 | DeBlander |
| 6,070,905 A | * | 6/2000 | Renault ................. F16F 1/3605 280/751 |
| 6,789,645 B1 | | 9/2004 | Deblander |
| 7,631,727 B2 | | 12/2009 | Thomas |
| 8,282,085 B2 | | 10/2012 | Manfredotti |
| 8,528,862 B2 | | 9/2013 | Liguore |
| 8,720,641 B2 | | 5/2014 | Fisk |
| 8,889,243 B2 | | 11/2014 | Hanschen |
| 2006/0208135 A1 | | 9/2006 | Liguore |
| 2008/0128202 A1 | | 6/2008 | Palumbo |
| 2008/0248274 A1 | | 10/2008 | Hierholz |
| 2011/0248117 A1 | | 10/2011 | Boock |

FOREIGN PATENT DOCUMENTS

| | | | | |
|---|---|---|---|---|
| EP | | 1995052 A1 | * 11/2008 | ........... B31D 3/0207 |
| EP | | 1 816 651 | 9/2013 | |
| WO | WO 1997/38237 | | 10/1997 | |
| WO | WO-2013185926 A1 | | * 12/2013 | |

OTHER PUBLICATIONS

Proceedings of SPIE vol. 5760 (2005) • p. 89, "Experimental and finite element analysis of stand-off layer damping treatments for beams", University of Washington; Seattle, WA, pp. 89-99.
Atif H. Chaudry, MS Thesis, Univ of MD, (2006) Passive Stand-Off Layer Damping Treatment: Theory and Experiments, 143 pages.
The 20th International Conference on Offshore Mechanics and Arctic Engineering, OMAE01/MAT-3381, Optimization of Sandwich Multilayer Viscoelastic Composite Structure for Vibration Damping, Laboratório de Dinamica e Vibracoes, Pontiffcia Universidade, Catolica do Rio de Janeiro (Jun. 2001), pp. 257-264.
International Search Report for PCT/US2016/037608, dated Oct. 12, 2016 (4 pages).

* cited by examiner

MULTILAYER DAMPING MATERIAL

CROSS REFERENCE TO RELATED APPLICATIONS

This application is a national stage filing under 35 U.S.C. 371 of PCT/US2016/037608, filed Jun. 15, 2016, which claims the benefit of U.S. Provisional Patent Application No. 62/175,638, filed Jun. 15, 2015, the disclosures of which are incorporated by reference in their entirety herein.

FIELD OF THE INVENTION

The invention relates to a multilayer damping material for damping a vibrating surface, in particular to a damping material comprising at least one constraining layer, at least one dissipating layer and at least one kinetic spacer layer, and more particularly to such a damping material where the kinetic spacer layer comprises multiple spacer elements arranged between the constraining layer and the vibrating surface, when used for damping the vibrating surface.

BACKGROUND

The engine, drive train and other portions of a vehicle (e.g., automobiles, airplanes, motorboats, etc.) can generate mechanical vibrations that propagate through the body of the vehicle as structure borne noise. Such structure born noise can transform into air borne noise. It can be useful to damp these structural vibrations before their kinetic energy is radiated as air borne noise into other vehicle areas (e.g., inside a passenger compartment).

Typically, one or more applications of viscoelastic materials like bitumen or sprayed plastic masses (i.e., single layer damping material) are coated or otherwise applied onto, e.g., the surface of a body panel of a vehicle for damping these structural vibrations. The deformation of the body panel and attached viscoelastic layer can lead to stretching and/or compressing of the polymer chains within the viscoelastic material, resulting in the dissipation of mechanical energy in the form of, e.g., structural borne vibration (e.g., from the engine, tire/road interactions, compressors, fans, etc.) and the damping of vibrations.

A better damping performance can be achieved by adding a second layer to the damping material, a constraining layer (constrained layer damping—CLD). The constraining layer is selected such that it is not as elastic as the viscoelastic material layer and may be attached on top of the viscoelastic material layer or dissipating layer opposite of the panel to be damped. The constraining layer may for example be made out of aluminium. When the constraining layer is attached on top of the viscoelastic material layer, each deformation of the panel leads not only to stretching and compressing of the polymer chains within the dissipating layer but also to shear within the dissipating layer. Thus, the damping material with an additional constraining layer is more effective than the damping material with only the dissipating layer. The materials used for constraining layer add weight to the damping material which might be a problem, when used in a vehicle. They also add bending stiffness to the damping material, which may lead to challenges, when applying the CLD material to complex shaped structures.

The efficiency of damping material can also be enhanced when the deformation of the viscoelastic damping layer or dissipating layer is amplified by a "kinetic spacer" or "stand-off" layer. The stand-off layer is usually arranged between the panel to be damped and the constraining layer, typically with a viscoelastic dissipating layer on one or both sides of it. One way to improve the efficiency is to increase the strain within the dissipating layer(s) by using a kinetic spacer layer.

One example of a commercially available damping material is the E-A-R Brand material ADC-1312 made by Aearo Technologies LLC (Indianapolis, Ind.) and commercially available from 3M Company, Minn., USA. This material includes a polyurethane (PU) foam, which provides excellent performance at low weight, and a thin Aluminium sheet.

Furthermore, slotted stand-off layers are known. Such slots have been found to reduce the bending stiffness or rigidity and the overall mass or weight of the damping material (see for example proceedings of the Society of Photo-Optical Instrumentation Engineers, Vol. 3989 (2000), page 132).

U.S. Pat. No. 2,069,413 discloses a material for damping vibrations of vibratile thin bodies or panels, that is, thin bodies or panels which are inherently capable of free vibration. These materials are used for the purpose of decreasing the noises and disturbing air-throbs within vehicle bodies, when the vehicles are in operation.

U.S. Pat. No. 5,186,996 discloses a sound absorbing multi-layer structure for noise reduction in automobiles. The sound-absorbing multi-layer structure comprises a structural part which is capable of oscillating, and a loosely engaging damping sheet. The damping sheet comprises a flexible material and high material absorption factor and is made up of a heavy sheet with a viscoelastic support layer tightly connected thereto. The support layer comprises a plurality of angularly constructed support elements. It is essential that the individual support elements be of angular construction, in order to obtain heightened viscoelastic absorptions in the areas of the individual edges of the support elements. The floors, dashboards, doors, roofs and so forth are covered in order to reduce the noise level produced in each of these automobile body parts.

In view of the above there is still a need for a damping material that provides highly effective damping characteristics while being relatively light-weight and exhibiting a low degree of bending stiffness.

SUMMARY OF THE INVENTION

The present invention provides a multilayer damping material for damping a vibrating surface. As used herein, a "vibrating surface" is a surface of a substrate (e.g., a vehicle, appliance or machine body part) or other structure that can vibrate or otherwise oscillate. The damping material comprises: at least one constraining layer; at least one dissipating layer; and at least one kinetic spacer layer comprising multiple spacer elements. The kinetic spacer layer is arranged between the constraining layer and the vibrating surface, when used for damping the vibrating surface. Each spacer element has opposite ends, with at least one end of each of the multiple spacer elements being embedded in, bonded to, in contact with, or in close proximity to the dissipating layer, such that energy is dissipated within the multilayer damping material, through movement of the at least one end of each of the multiple spacer elements.

The multilayer damping material according to the invention provides a damping material or a damping system that is able to dissipate vibration energy and/or noise from a vibrating surface (e.g. forming a portion of a body panel or other body part or component) of (a) a vehicle such as, for example, an automobile (e.g., a car, truck, bus, etc.), aircraft (e.g., a single engine or jet engine airplane, etc.), train, water vessel (e.g., ship, boat, etc.), or any other vehicle, (b) an appliance (e.g., a clothes or dish washing machine, a blender, etc.) and/or (c) any other machine or system generating vibrations and/or noise (e.g., a power generator, elevator, air handling system, etc.).

BRIEF DESCRIPTION OF THE DRAWINGS

The invention will now be described in more detail with reference to the following Figures exemplifying particular embodiments of the invention.

DETAILED DESCRIPTION OF EMBODIMENTS

Figure 1A:
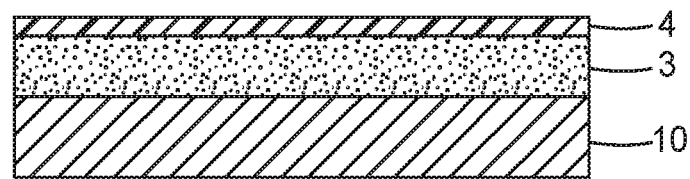
FIG. 1A is a cross-sectional and schematic view of a multilayer constrained damping material in a not deformed stage.

Herein below various embodiments of the present invention are described and some shown in the drawings, with like elements provided with the same reference numbers. Additional teachings of the invention are also described below.

Figure 1B:
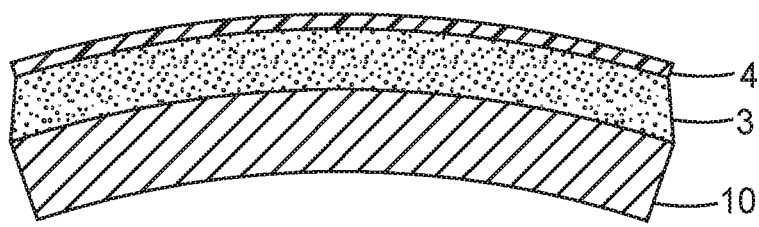
FIG. 1B is a cross-sectional and schematic view of a multilayer constrained damping material in a deformed stage.

FIG. 1a is a cross-sectional and schematic view of a multilayer constrained damping material according to the prior art with a panel 10 that is the component to be damped or the vibrating surface. The damping material itself comprises a dissipating layer 3 and a constraining layer 4. The dissipating layer 3 may comprise a viscoelastic material and the constraining layer 4 may comprise a material that is not as elastic as the dissipating layer 3. When the constraining layer 4 is attached to the dissipating layer, each deformation in the panel 10 leads not only to stretching and compressing in the dissipating layer but also to shear (see FIG. 1b). Thus, a damping material with an additional constraining layer is more effective as damping materials with only a dissipating layer.

Figure 2:
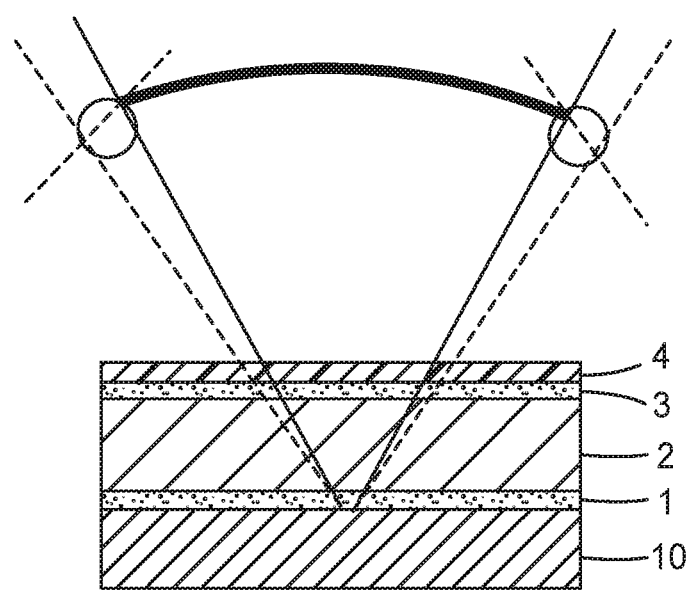
FIG. 2 is a cross-sectional and schematic view of a multilayer constrained damping material with a kinetic spacer layer.

FIG. 2 is a cross-sectional and schematic view of a multilayer constrained damping material according to the prior art with a kinetic spacer layer. The Figure shows again a panel 10, which is the component to be damped or the vibrating surface. The multilayer damping material comprises a first dissipating or adhesive layer 1, a kinetic spacer layer 2, a second dissipating layer 3 and a constraining layer 4. The kinetic spacer layer 2 transports the deformation of the panel 10 into the dissipating layer 3. Because of the lever effect the deformation gets increased, thus the stretching, compressing and shear caused in the dissipating layer gets increased as well. Thus, the kinetic spacer layer 2 increases the strain in the dissipating layer 3. One example of a kinetic spacer layer material used in the prior art is PU foam.

Figure 3:
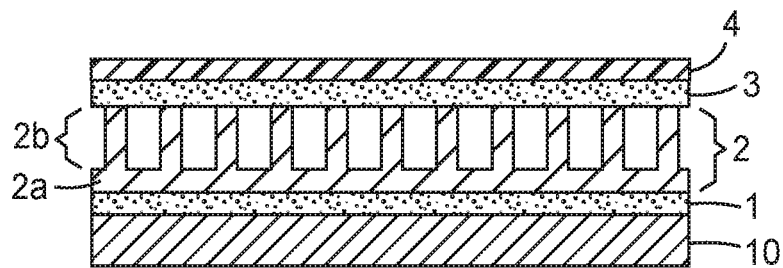
FIG. 3 is a cross-sectional and schematic view of one embodiment of a multilayer damping material according to the invention.

FIG. 3 is a cross-sectional and schematic view of one embodiment of a multilayer damping material according to the invention. FIG. 3 shows again a panel 10, the component to be damped or vibration surface. The multilayer damping material according to the invention comprise in that order a first dissipating layer 1 next to the panel 10, a kinetic spacer layer 2, a second dissipating layer 3 and a constraining layer 4. The kinetic spacer layer 2 comprises a base layer 2a and multiple spacer elements 2b extending form the base layer 2a. The base layer 2a is arranged adjacent to the first dissipating layer 1, whereby the multiple spacer elements 2b are extending into the direction of the second dissipating layer 3 (pins up). Providing a kinetic spacer layer 2 with multiple spacer elements 2b provides the advantage of a) saving weight compared to a spacer layer with a homogeneous kinetic spacer layer and b) providing the possibility of bending the multilayer damping material according to the invention.

Figure 4:
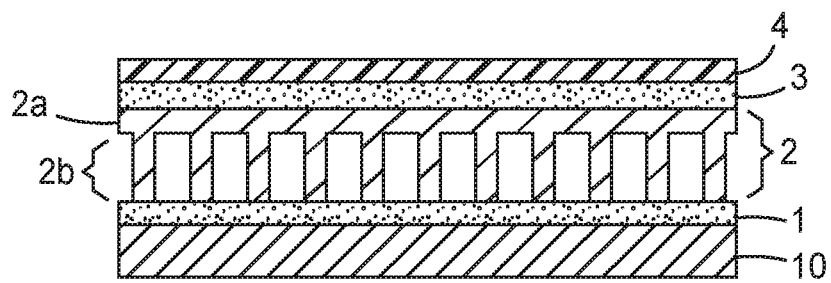
FIG. 4 is a cross-sectional and schematic view of another embodiment of a multilayer damping material according to the invention.

FIG. 4 is a cross-sectional and schematic view of one embodiment of a multilayer damping material according to the invention. FIG. 4 shows again a panel 10, the component to be damped. The multilayer damping material according to the invention comprises in that order a first dissipating layer 1 next to the panel 10, a kinetic spacer layer 2, an optional second dissipating layer 3 and a constraining layer 4—as the embodiment shown in FIG. 3. If the second dissipating layer 3 is not used, it can be desirable for the constraining layer 4 and the base layer 2a to be bondable to one another, e.g., by being fused together using applied heat, friction, etc. or otherwise secured relative to one another, e.g., with mechanical fastener(s). The kinetic spacer layer also comprises a base layer 2a and multiple spacer elements 2b extending from the base layer 2a. The difference between the two embodiments is the orientation of the multiple spacer elements 2b and the base layer 2a relative to the other layers of the multilayer damping material. The base layer 2a is arranged adjacent the second dissipating layer 3, whereby the multiple spacer elements 2b are extending into the direction of the first dissipating layer 1 (pins down).

Figure 5:
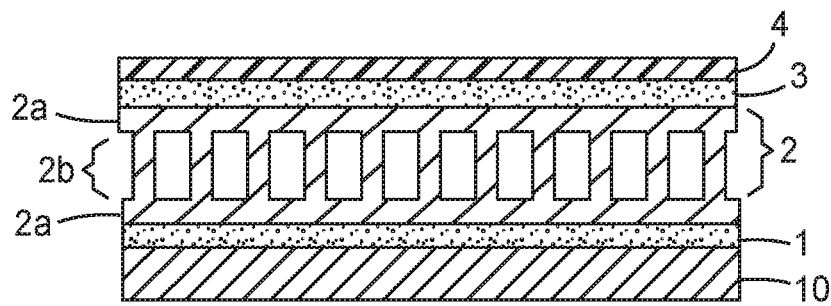
FIG. 5 is a cross-sectional and schematic view of another embodiment of the multilayer damping material according to the invention.

According to FIG. 5, the kinetic spacer layer 2 comprises two base layers 2a, one on each side of the kinetic spacer elements 2b.

Figure 6:
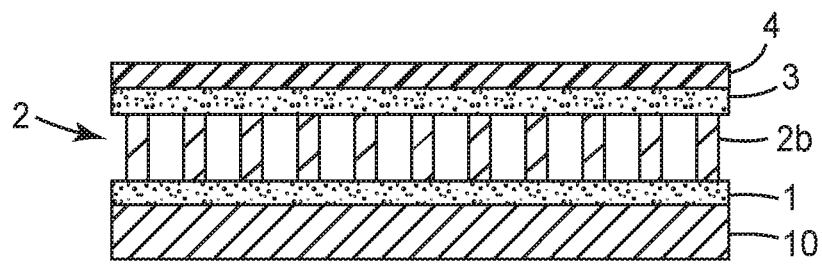
FIG. 6 is a cross-sectional and schematic view of another embodiment of a multilayer damping material according to the invention.

FIG. 6 is cross-sectional and schematic view of another embodiment of a multilayer damping material according to the invention. Again, the multilayer composition starts with the panel 10, the component to be damped. The multilayer damping material according to the invention comprises in that order a first dissipating layer 1 next to the panel 10, a kinetic spacer layer 2, a second dissipating layer 3 and a constraining layer 4—as the embodiments shown in FIG. 3 and FIG. 4. The kinetic spacer layer 2 comprises no base layer but only kinetic spacer elements 2b.

Figure 7:
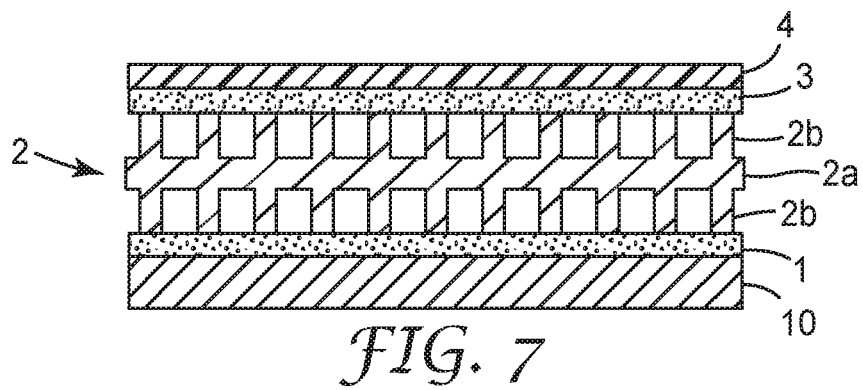
FIG. 7 is a cross-sectional and schematic view of another embodiment of a multilayer damping material according to the invention.

FIG. 7 is a cross-sectional and schematic view of another embodiment of a multilayer damping material according to the invention. Next to the panel 10 it can be seen a multilayer damping material with a first dissipating layer 1 next to the panel 10, a kinetic spacer layer 2, a second dissipating layer 3 and a constraining layer 4—as the embodiments shown in FIGS. 3, 4, 5 and 6. The kinetic spacer layer 2 comprises a base 2a and multiple kinetic spacer elements 2b extending in both direction of the base layer 2a and are embedded or bonded to the two dissipating layers 1 and 3. It is also possible, to have a split base layer 2a with an additional third dissipating layer in between those two layers 2a (not shown in the drawings).

Figure 8:
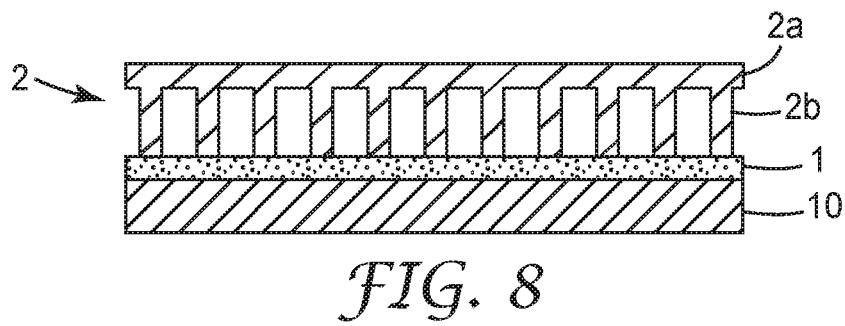
FIG. 8 is a cross-sectional and schematic view of another embodiment of a multilayer damping material according to the invention.

The embodiment shown in FIG. 8 differs from the before described embodiments of the invention, in that the two top layers (dissipating layer 3 and constraining layer 4) are removed. The multilayer damping material therefore comprises a dissipating layer 1 and a spacer layer 2, wherein the spacer layer 2 comprises a base layer 2a and multiple kinetic spacer elements 2b. The multiple kinetic spacer elements are arranged as to separate the dissipating layer 1 and the base layer 2a. In this embodiment the base layer 2a acts as a constraining layer 4.

Figure 9:
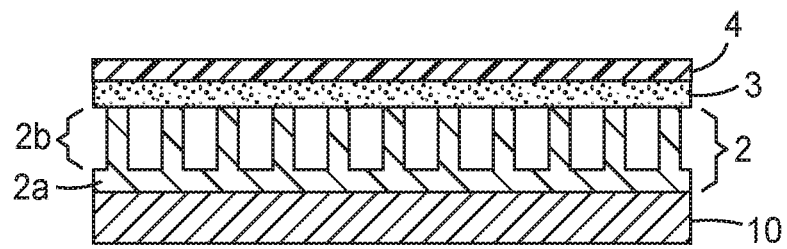
FIG. 9 is a cross-sectional and schematic view of another embodiment of a multilayer damping material according to the invention.
Figure 10:
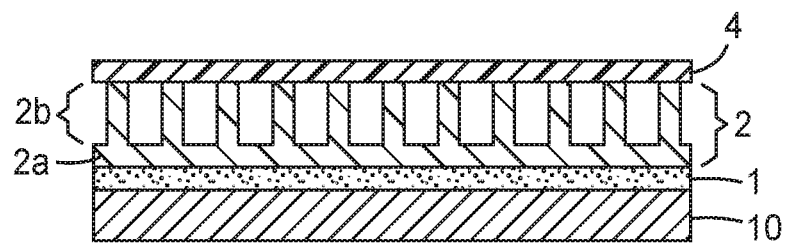
FIG. 10 is a cross-sectional and schematic view of another embodiment of a multilayer damping material according to the invention.

The embodiments shown in FIGS. 9 and 10 show the embodiment of FIG. 3, without layer 1 (FIG. 9) and without layer 3 (FIG. 10). With all of the other embodiments shown in FIGS. 4 to 7, it is also possible to either eliminate layer 1 or layer 3. In these embodiments the kinetic spacer layer may be attached to the panel 10 (FIG. 9) or the constraining layer (FIG. 10) by means of an adhesive without any or only little viscoelastic properties, such as for example an epoxy resin adhesive.

Figure 11:
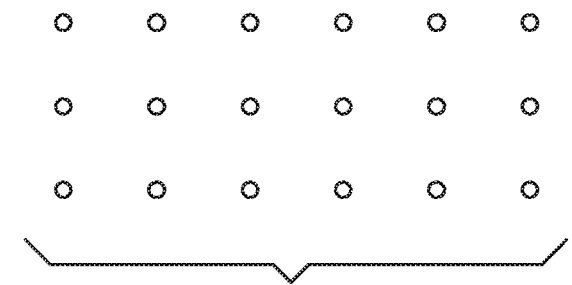
FIG. 11 is a schematic top-view of an exemplary kinetic spacer layer with multiple kinetic spacer elements being arranged equally spaced apart from each other.
Figure 12:
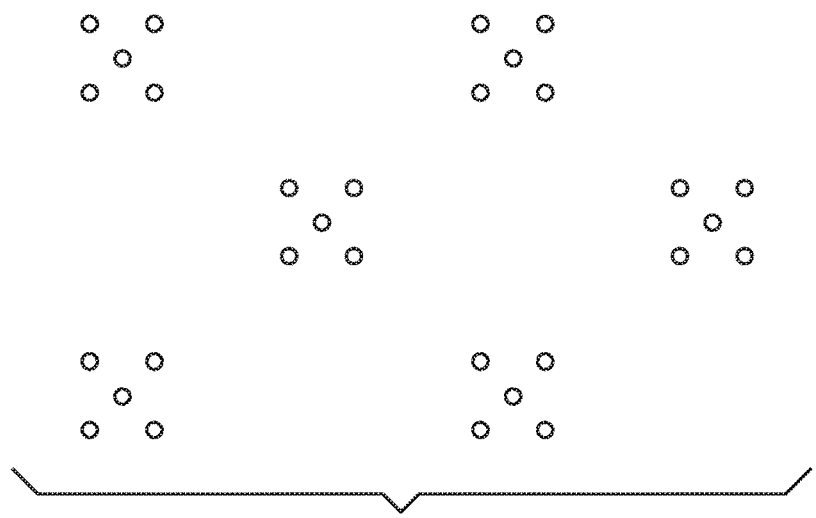
FIG. 12 is a schematic top-view of an exemplary kinetic spacer layer with multiple kinetic spacer elements being arranged homogeneously or uniformly at locations within the kinetic spacer layer.
Figure 13:
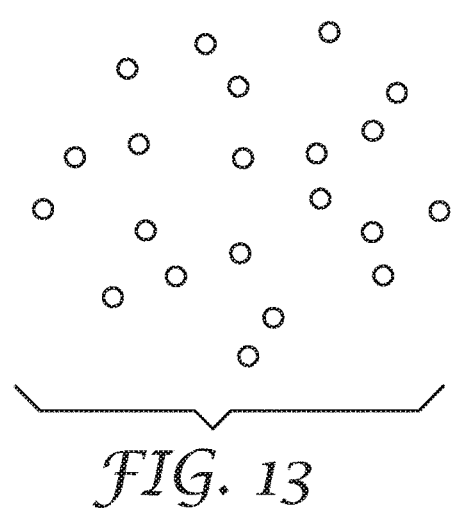
FIG. 13 is a schematic top-view of an exemplary kinetic spacer layer with multiple kinetic spacer elements being arranged in-homogeneously or non-uniformly at locations within the kinetic spacer layer.
Figure 14A:
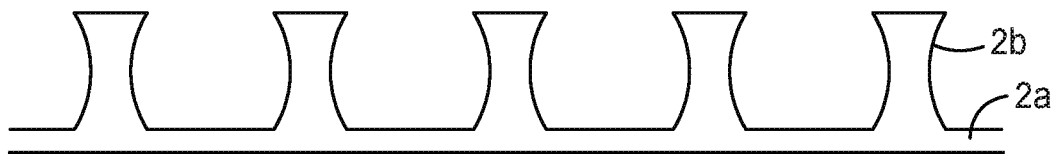
FIGS. 14A through 14H are schematic side-views of different kinetic spacer elements of the kinetic spacer layer according to the invention.
Figure 14B:
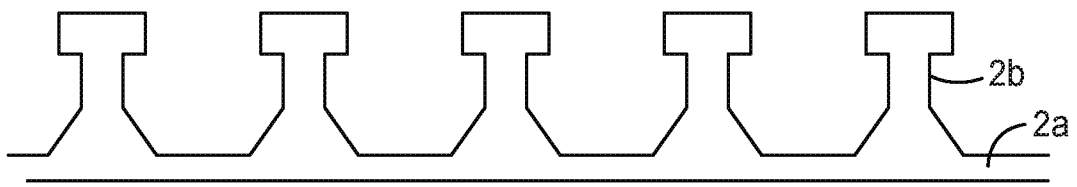
Figure 14C:
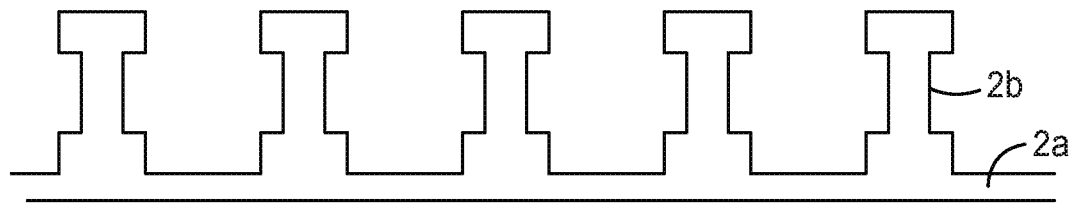
Figure 14D:
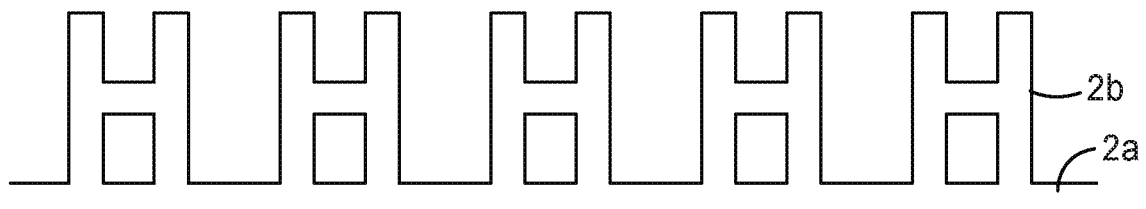
Figure 14E:
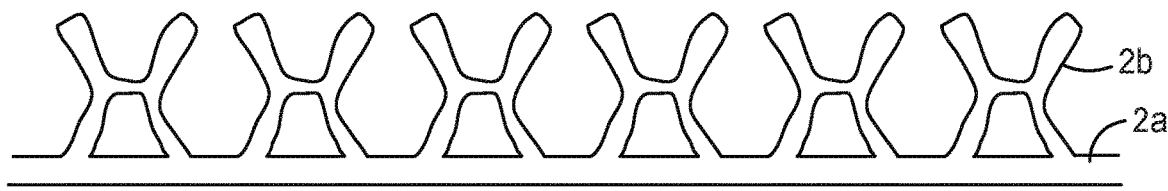
Figure 14F:
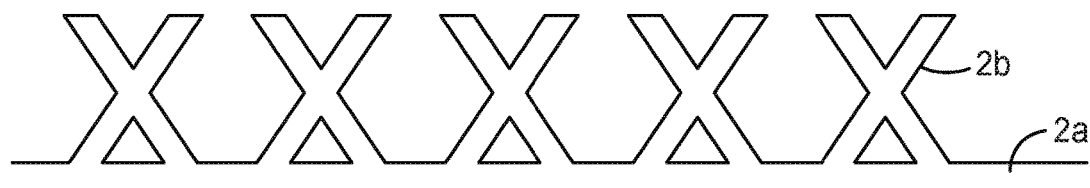
Figure 14G:
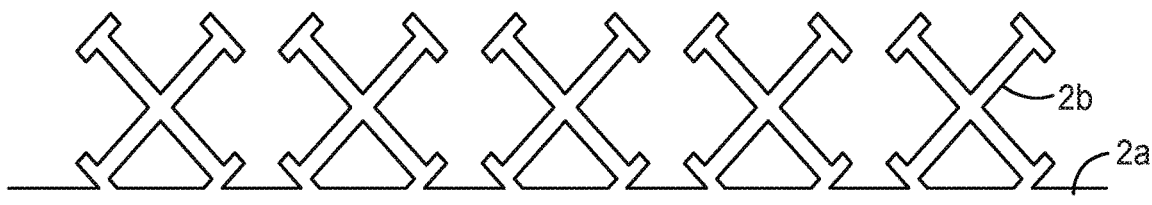
Figure 14H:
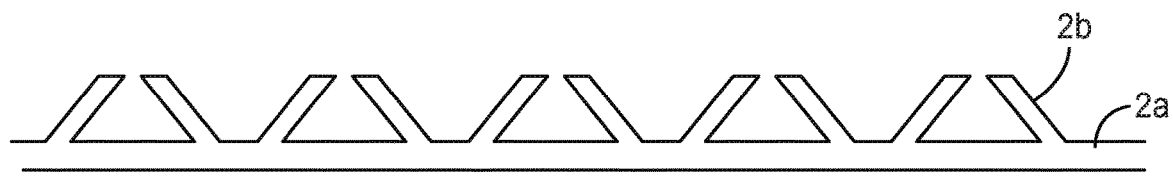
Figure 22:
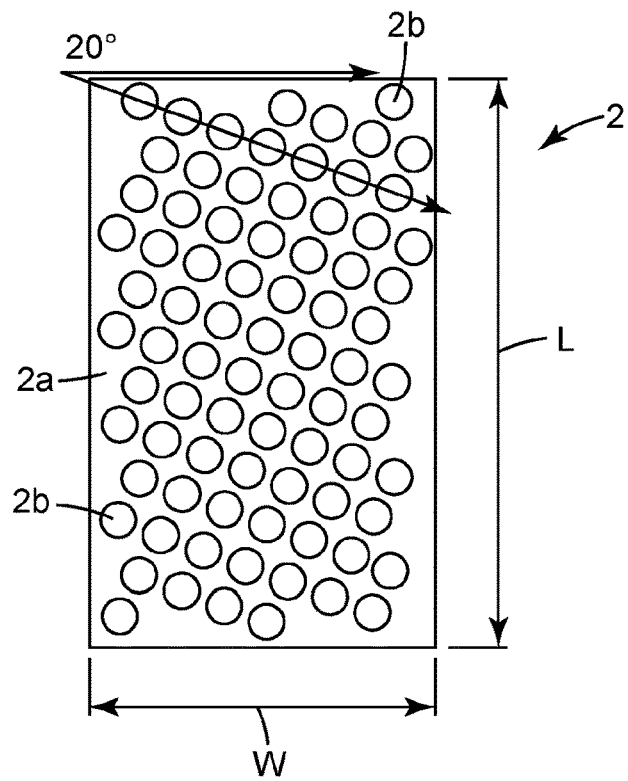
FIG. 22 is a schematic top-view of another embodiment of a kinetic spacer layer according to the invention having a width W and length L, with a pattern of slanted kinetic spacer elements.

The following FIGS. 11 to 13 and 22 are schematic top-views of kinetic spacer layers with multiple kinetic spacer elements being arranged in different ways. In FIG. 11, they are arranged equally spaced apart from each other. In FIG. 12, they are arranged homogeneously or uniform at locations within the kinetic spacer layer. Here they are arranged within groups of five kinetic spacer elements. In FIG. 13, they are arranged in-homogeneously or non-uniformly at locations within the kinetic spacer layer. Here they are arranged randomly. It can be desirable for a kinetic spacer layer 2 of the invention to have kinetic spacer elements 2b arranged in transverse rows that are slanted off of the width direction W by an angle (e.g., of about 20° as shown in FIG. 22).

FIGS. 14A through 14H show schematic side-views of possible kinetic spacer elements of the kinetic spacer layer 2b. As can be seen from the drawings a lot of different shapes are possible, such as for example different I-shaped, H-shaped, or x-shaped kinetic spacer elements, as well as other shapes such as, for example, spherical-shaped kinetic spacer elements (not shown), which could be solid or thin walled hollow glass, ceramic or plastic beads. The kinetic spacer elements are shown as one homogenous body, but as already described above it is also possible to make them out of more than one material. All the shown shapes can be varied, like varying the size, dimension, make the outer skins more round etc. They may also be hollow.

Figure 15A:
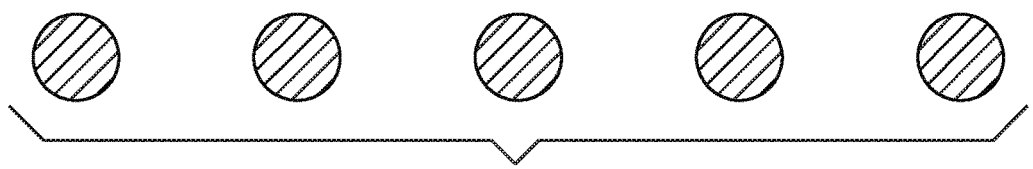
FIGS. 15A through 15K are schematic top-views of different kinetic spacer elements of the kinetic spacer layer according to the invention.
Figure 15B:
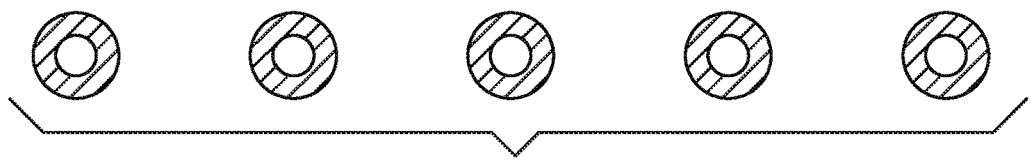
Figure 15C:
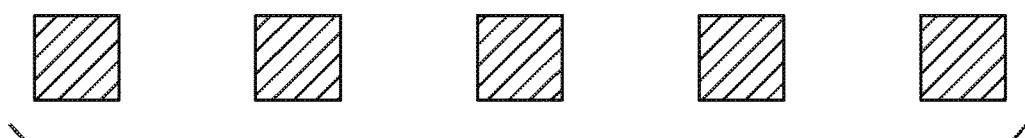
Figure 15D:
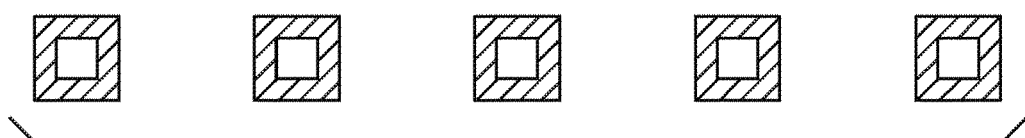
Figure 15E:
Figure 15F:
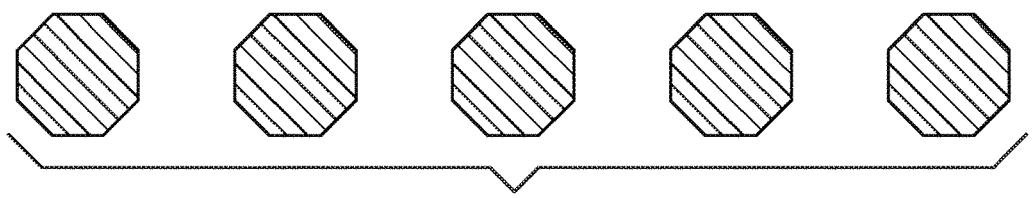
Figure 15G:
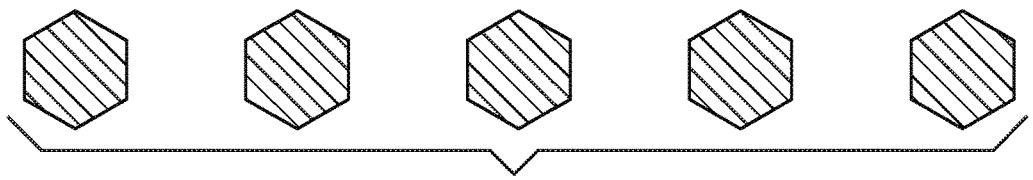
Figure 15H:
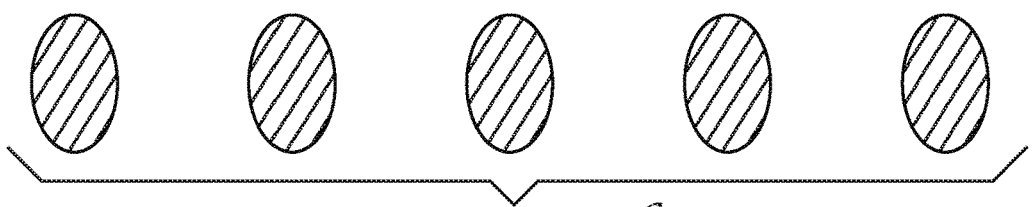
Figure 15I:
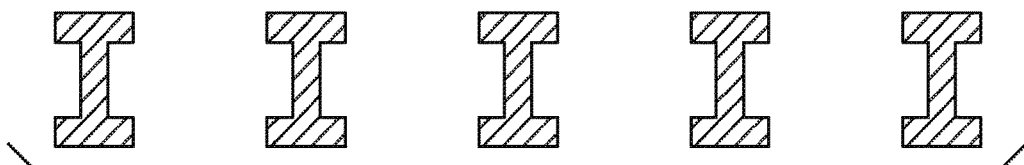
Figure 15J:
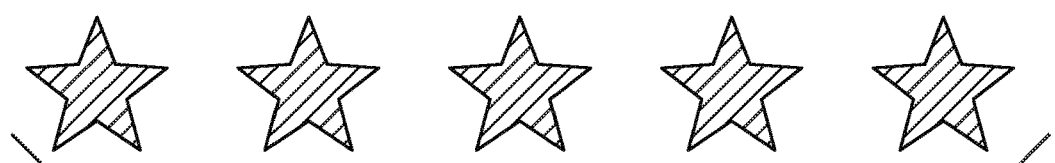
Figure 15K:

FIGS. 15A thorough 15K show schematic top-views of possible kinetic spacer elements of the kinetic spacer layer 2b. As can be seen from the drawings a lot of different cross-sectional shapes are possible, like circle, square, hexagon, octagon, triangle, odd-shaped polygon, star-shaped kinetic spacer elements. The kinetic spacer elements may be filled or hollow (e.g., tubular). They may be filled with the same material as the outer sheath forming the spacer element or they may be filled with a different material (e.g., a material that provides additional damping characteristics).

Figure 16:
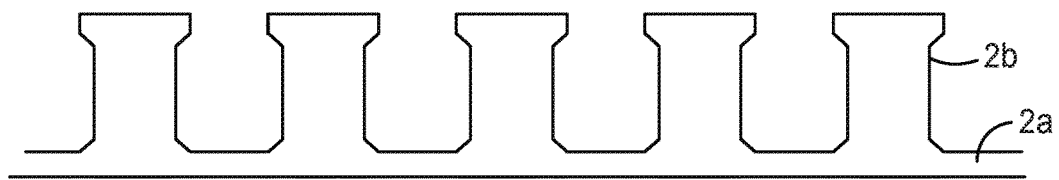
FIG. 16 is a schematic side-view of another embodiment of kinetic spacer elements of the kinetic spacer layer according to the invention.
Figure 17:
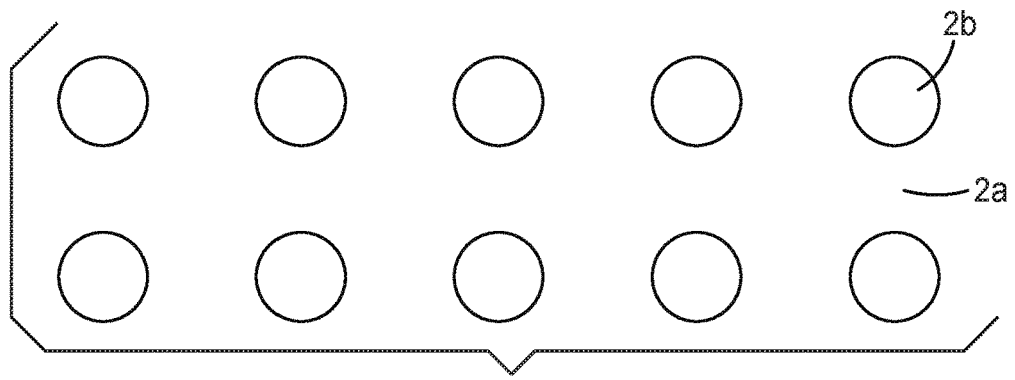
FIG. 17 is a schematic top-view of the embodiment of the kinetic spacer elements shown in FIG. 16.

FIG. 16 is a side-view of an additional kinetic spacer layer according to the invention with I-shaped kinetic spacer layer elements extending from a base layer. As can be seen in FIG. 17 they are equally space apart from each other.

Figure 18:
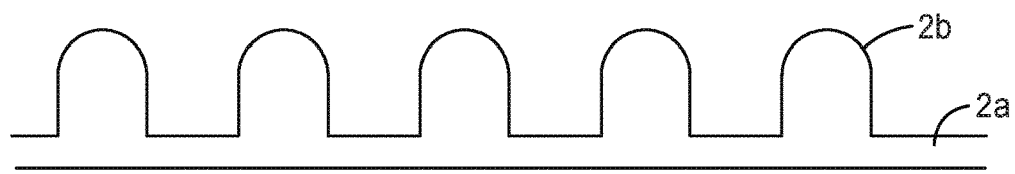
FIG. 18 is a schematic side-view of another embodiment of kinetic spacer elements of the kinetic spacer layer according to the invention.
Figure 19:
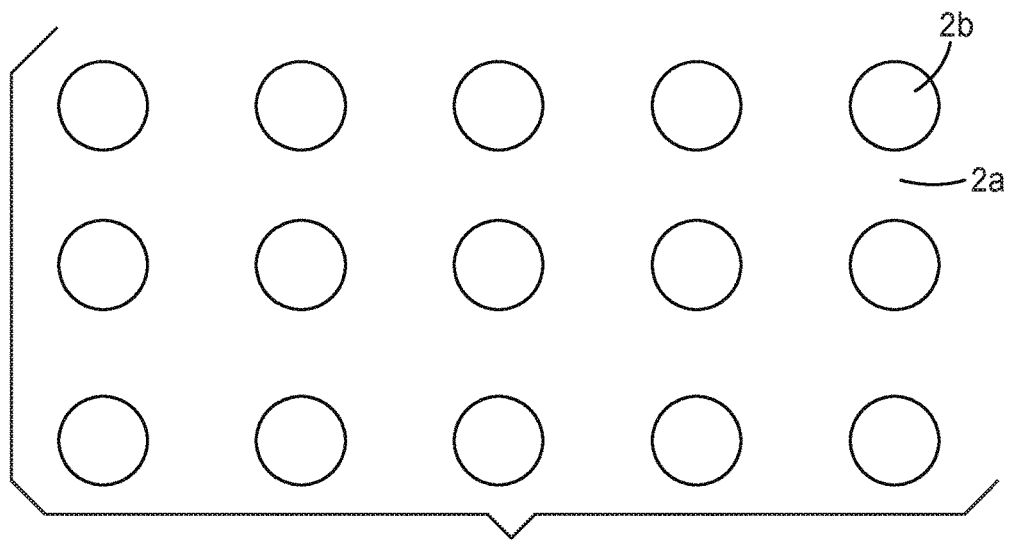
FIG. 19 is a schematic top-view of the embodiment of the kinetic spacer elements shown in FIG. 18.

FIG. 18 is a side-view of an additional kinetic spacer layer according to the invention with cylindrical kinetic spacer elements extending from a base layer. The kinetic spacer elements comprise a round top end. It may be desirable to cap the round top end of each of the spacer elements of this kinetic spacer layer, for the reasons discussed above. As can be seen in FIG. 19 they are equally space apart from each other.

Figure 23A:
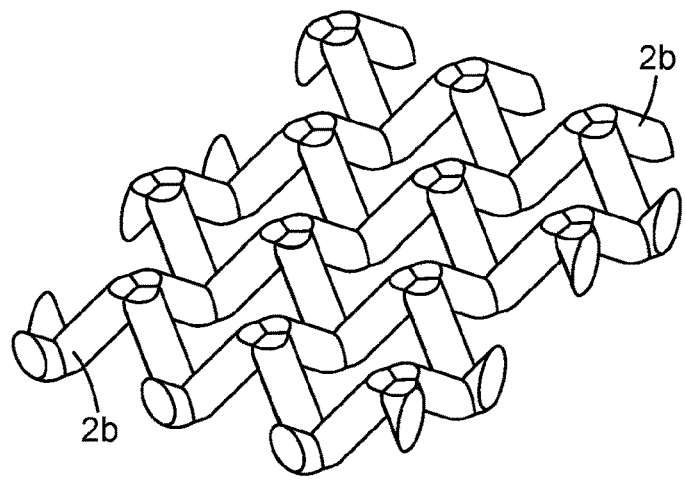
FIG. 23A is a schematic perspective view of another embodiment of kinetic spacer elements of the kinetic spacer layer according to the invention.
Figure 23B:
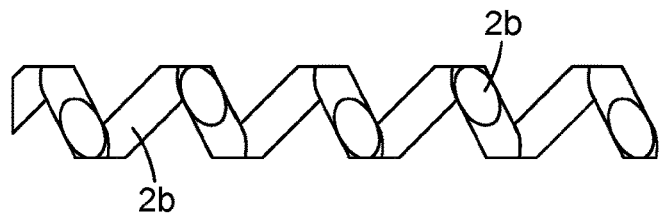
FIG. 23B is a side view of the kinetic spacer elements of FIG. 23A.
Figure 23C:
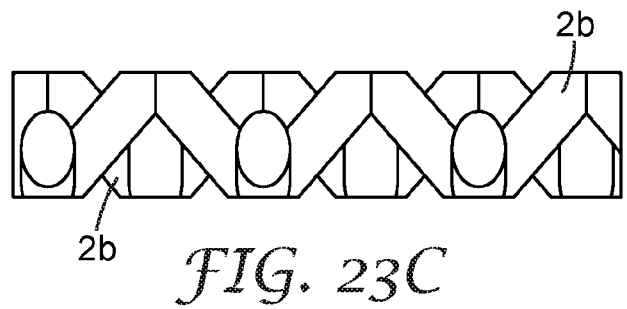
FIG. 23C is an end view of the kinetic spacer elements of FIG. 23A.

FIGS. 23A-23C are views of another embodiment of kinetic spacer elements of the kinetic spacer layer according to the invention, where each of the spacer elements 2b are tilted at an angle of about 45° in groups of three adjacent elements 2b. The three spacer elements 2b of each group are joined together at one of their ends (e.g., by adhesive or heat fusing) to form a tripod shape. These groups of three spacer elements 2b are joined to each other at their other ends.

Figure 24A:
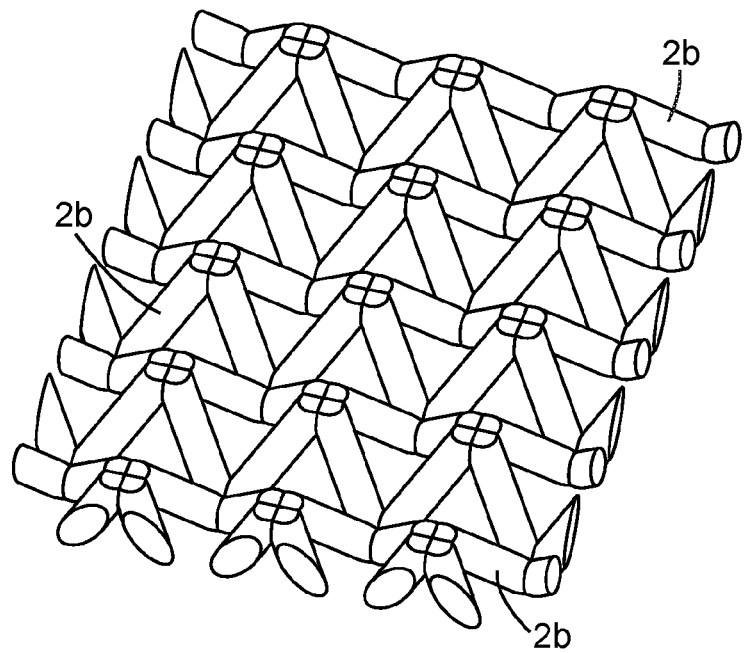
FIG. 24A is a schematic perspective view of another embodiment of kinetic spacer elements of the kinetic spacer layer according to the invention.
Figure 24B:
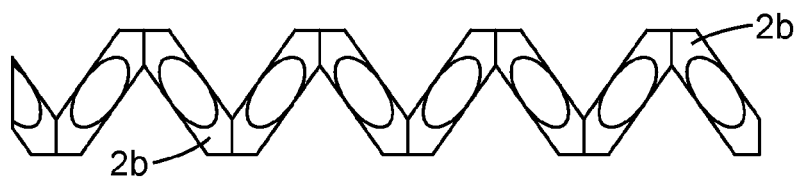
FIG. 24B is a side view of the kinetic spacer elements of FIG. 24A.
Figure 24C:
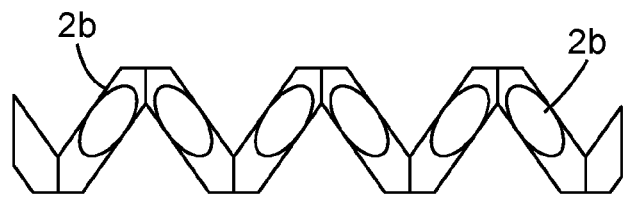
FIG. 24C is an end view of the kinetic spacer elements of FIG. 24A.

FIGS. 24A to 24C are schematic views of another embodiment of kinetic spacer elements of the kinetic spacer layer according to the invention, where each of the spacer elements 2b are tilted at an angle of about 45° in groups of four adjacent elements 2b. The four spacer elements 2b of each group are joined together at one of their ends (e.g., by adhesive or heat fusing) to form a shape similar to the tripod shape of the FIG. 23 embodiment. These groups of four spacer elements 2b are likewise joined to each other at their other ends.

Figure 25:
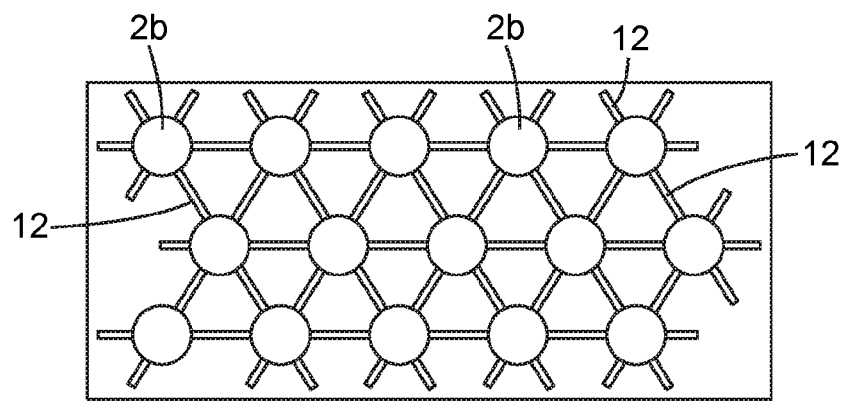
FIG. 25 is a schematic top view of an embodiment of a kinetic spacer layer with perpendicular spacer elements that are joined together by connector pins.

FIG. 25 is a schematic top view of an embodiment of a kinetic spacer layer with perpendicular spacer elements 2b that are each joined to their adjacent spacer elements 2b by relatively thin connector pins or rods 12. The connector pins 12 are shown located midway along the length of each spacer element 2b, but pins 12 can be located at any desired point along the length of each spacer element 2b.

Figure 26:
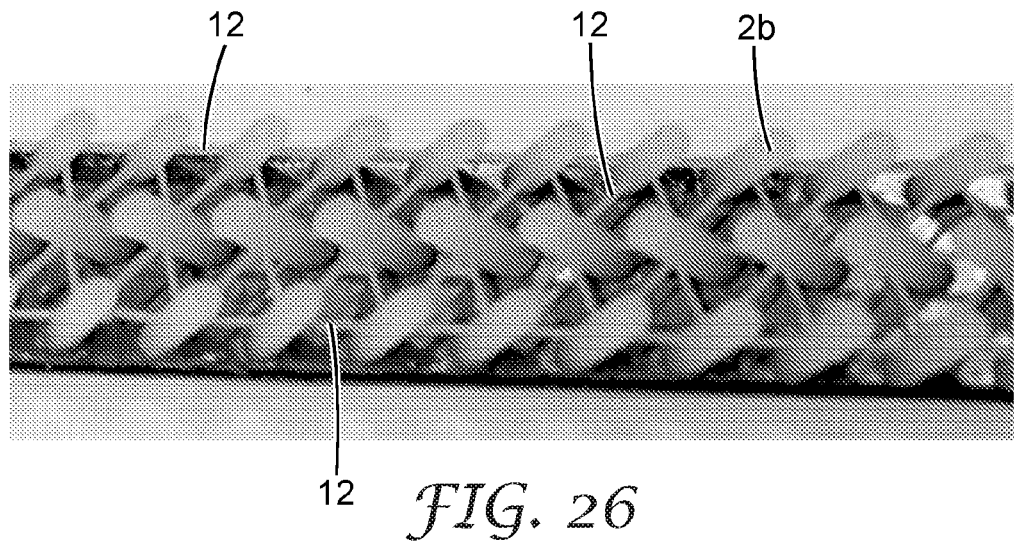
FIG. 26 is a schematic top view of an embodiment of a kinetic spacer layer with multiple rows of slanted spacer elements that are each tilted at the same angle and joined together by connector pins, with adjacent rows of the spacer elements tilting in opposite directions.

FIG. 26 is a schematic top view of an embodiment of a kinetic spacer layer with multiple rows of slanted spacer elements 2b that are each tilted at an angle of about 45° and joined together by connector pins or rods 12. Adjacent rows of the spacer elements 2b are tilted in opposite directions. The connector pins 12 are shown located midway along the length of each spacer element 2b, but pins 12 can be located at any desired point along the length of each spacer element 2b.

Figure 27:
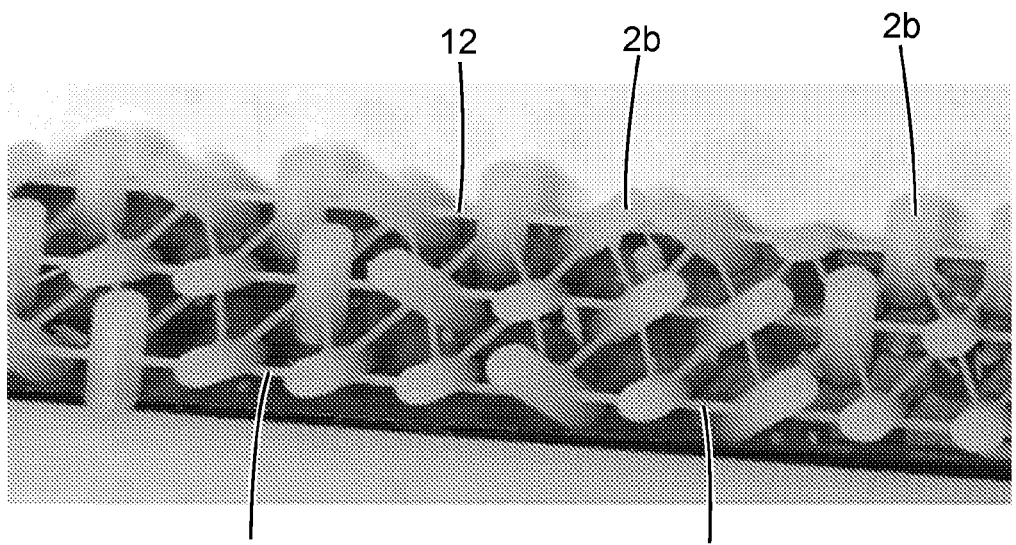
FIG. 27 is a schematic top view of an embodiment of a kinetic spacer layer with randomly angled spacer elements that are joined together by connector pins.

FIG. 27 is a schematic top view of an embodiment of a kinetic spacer layer with randomly angled spacer elements 2b that are joined together by connector pins or rods 12. The connector pins 12 are shown located midway along the length of each spacer element 2b, but pins 12 can be located at any desired point along the length of each spacer element 2b.

As an exemplary example for kinetic spacer elements, the following dimensions are mentioned here. The cylindrical elements may have a diameter of about 2 mm and may be spaced approximately 4.1 mm apart. They may be in the range of from about 0.4 mm up to about 8 mm tall (e.g., about 2.2 mm or 2.6 mm tall). The base layer can have a thickness in the range of from about 0.01 mm up to about 2 mm (e.g., about 0.2 mm). They may for example be made from a polypropylene resin. They may have two layers of 0.13 mm adhesive on either side and a 0.13 mm constraining layer.

A cantilever beam composed of the damping treatment of this embodiment was modeled in order to compare its bending compliance to that of conventional standoff dampers. The commercially available code, ANSYS, was used to construct a linear elastic finite element model of this embodiment. These models consisted of the damping treatment only without the usual vibrating surface. The unsupported beam length was 216 mm and the beam width and height were 2.87 mm and approximately 2.80 mm, respectively. The kinetic spacer elements were arranged so that the free ends faced away from the aluminum constraining layer. The force on the end of the cantilever beam was 1 N per unit width. Compliance is calculated as the deflection at the end of the beam divided by applied load. The larger the compliance value, the more flexible the sample. When compared to the modeled compliance for PU foam and for a standoff damper with the PU foam replaced by solid polypropylene (PP), this embodiment shows far greater compliance, as shown in the table below.

| Treatment | Thickness, mm | Compliance, $m^2/N$ |
|---|---|---|
| This embodiment | 2.80 | 0.0879 |
| PU foam standoff treatment | 2.71 | 0.0018 |
| Standoff treatment with solid PP layer | 2.71 | 0.0004 |

These finite element models were further expanded to examine the damping performance of the three treatments listed in the table above. To incorporate the vibrating surface, a 1 mm thick steel beam was added to the models. The well-known modal strain energy method was used to calculate the system loss factor for each treatment. Material properties for the various treatments are given in the table below:

| | This embodiment | PU foam standoff | Solid PP standoff |
|---|---|---|---|
| Aluminum Young's modulus, MPa | 68.95 | 68.95 | 68.95 |
| Aluminum Poisson's ratio | 0.3 | 0.3 | 0.3 |
| Aluminum density, $kg/m^3$ | 2700 | 2700 | 2700 |
| Steel Young's modulus, MPa | 206.85 | 206.85 | 206.85 |
| Steel Poisson's ratio | 0.3 | 0.3 | 0.3 |
| Steel density, $kg/m^3$ | 8100 | 8100 | 8100 |
| Dissipating layer shear modulus, MPa | 3.0 | 3.0 | 3.0 |
| Dissipating layer Poisson's ratio | 0.4 | 0.4 | 0.4 |
| Dissipating layer density, $kg/m^3$ | 1000 | 1000 | 1000 |
| Standoff layer Young's modulus, MPa | 1724 | 311 | 1724 |
| Standoff layer Poisson's ratio | 0.35 | 0.4 | 0.35 |
| Standoff layer density, $kg/m^3$ | 1000 | 427 | 1000 |

The system loss factor for each configuration for the second bending mode of the steel bar was calculated as summarized below. A system loss factor to basis weight ratio (i.e., "weight efficiency"=system loss factor/basis weight) was then calculated. Weight efficiency has units of $m^2/Kg$. This is a measure of the damping provided per unit mass for the damping treatment.

| | This embodiment | PU foam standoff | Solid PP standoff |
|---|---|---|---|
| System loss factor | 0.235 | 0.138 | 0.158 |
| Basis weight, $kg/m^2$ | 1.128 | 1.590 | 4.767 |
| SLF/basis weight ratio, $m^2/kg$ | 0.208 | 0.087 | 0.033 |

To increase damping characteristics, it can be desirable for the dissipating layer to comprise viscoelastic material (e.g., a pressure sensitive adhesive) that is capable of dissipating energy when being deformed and/or stressed and/or compressed and/or when being exposed to shear and/or strain forces. In other words the majority of dissipation of energy can be due to shear strain within the dissipating layer. It is also possible that some energy is dissipated in the multiple spacer elements. Generally, the properties of the viscoelastic materials may be selected such that they tend to dissipate more energy when subject to shear strain and direct strain. Usually dissipating layers are made out of the following materials: bitumen, butyl, rubber, adhesives (e.g., epoxy or pressure sensitive adhesives) or resin compositions based on such materials. If the dissipating layer is an adhesive and is used to adhere the kinetic spacer layer to a surface experiencing vibrations to be damped, it can be desirable for that dissipating layer to be a high temperature resistive adhesive such as, for example, when that surface become hot. The dissipating layer may comprise a thickness between 0.05 and 5 mm, typically between 0.1 and 3 mm, for e.g. automotive applications.

The present damping structure may be operatively adapted (i.e., dimensioned, designed and/or configured) to exhibit some (i.e., less than 10%, 15%, 20%, 25%, 30%, 35%, 40%, 45%, or 50%), mostly (i.e., more than 50%, 55%, 60%, 65%, or 70%) or predominantly (i.e., greater than 75%, 80%, 85%, 90% or 95%) stiffening characteristics, compared to the damping characteristics it exhibits, after it is secured to a substrate (e.g., a body panel of a vehicle, appliance, machinery, etc.). Such a damping structure according to the invention could be used to stiffen a substrate (e.g., sheet metal) that has been reduced in thickness and/or made with a lighter/weaker material (e.g., from steel to aluminium), in order to reduce the overall weight of the substrate. In such an application, it can be desirable for the weight of the added damping structure to be less than the weight of the material removed from the substrate. To exhibit more stiffening characteristics, it can be desirable for the dissipating layer to comprise a higher elastic modulus material (e.g., a two part epoxy adhesive) that is less capable of deforming under stress in order to dissipate energy and more rigidly constrain movement of the at least one end of each of the multiple spacer elements embedded in, bonded to, in contact with, or in close proximity to the dissipating layer.

It can be desirable for the constraining layer of the multilayer damping material according to the invention to be selected such that it is not as elastic as a dissipating layer made of viscoelastic material. The constraining layer may be partially or completely made out of any lightweight, high modulus material such as, for example, some plastics (e.g., polycarbonates, etc.), some metals (e.g., aluminium alloys, titanium, steel (e.g., stainless steel, etc.), relatively rigid non-woven or woven polymer and fiber composite mats, plates or sheets (e.g., plastic impregnated fiberglass mats, carbon fiber polymeric composite sheets), or other composite layer like structures.

When the constraining layer is bonded or otherwise attached on top of a viscoelastic material dissipating layer, each deformation of the surface (e.g., of a body panel of a vehicle, appliance, etc.), on which the multilayer damping material is located, can lead not only to stretching and compressing of the polymer chains within the dissipating layer but also to shear within the dissipating layer. Accordingly, in one exemplary embodiment of the invention, the multilayer damping material can include two dissipating layers, with one on each side of the kinetic spacer layer.

The kinetic spacer layer according to the invention can fulfil the function of transporting the deformation or vibration of the surface (e.g., of a body panel) to be damped to the dissipating layer, thereby generating an increased strain within the dissipating layer, which increases the damping. The multilayer damping material of the invention may include at least one or more dissipating layers on one side, or at least one or more dissipating layers on either side, of the kinetic spacer layer (i.e., the kinetic spacer layer may be disposed between opposite dissipating layers). The kinetic spacer layers can also be referred to as "stand-off" layers and act as a strain magnifier. The kinetic spacer layer according to the invention provides multiple spacer elements that are arranged between the constraining layer and the vibrating surface, when used for damping the vibrating surface. The multiple spacer elements can transport the deformation of the surface (e.g., of a body panel) to be damped into a dissipating layer of the invention without adding much bending stiffness to the construction of the multilayer damping material. While the multilayer damping material, itself, can exhibit relatively low bending stiffness, before it is adhered or otherwise secured to the surface of a substrate (e.g., the sheet metal used to form a side of a body panel), after it is so secured, the multilayer damping material can cause an increase in the stiffness of the substrate.

In order to be able to transport the deformation or vibration of the surface (e.g., of a panel) to be damped into the dissipating layer and dissipate energy, the at least one of the opposite ends of the spacer elements of the kinetic spacer layer are embedded in, bonded to, in contact with, or in close proximity so as to at some point contact, the dissipating layer such as to allow the at least one end of the spacer elements to move while so disposed relative to the dissipating layer. While performing this movement strain and/or deformation can be caused in the dissipating layer which results in energy being dissipated within the multilayer damping material. Bonding of a spacer element end to the dissipating layer includes direct or indirect bonding to the dissipating layer, which includes embodiments with an additional layer between the kinetic spacer elements and the dissipating layer, where the additional layer is (e.g. a thin film) capable of allowing such movement of the spacer element end. The opposite ends of the kinetic spacer elements can define the side of the kinetic spacer layer facing the constraining layer or the opposite side facing the surface to be damped (e.g., of a panel), in both directions with or without an additional layer in between. The additional layer could be a priming layer.

According to one exemplary embodiment of the invention, the kinetic spacer elements may be arranged so as to separate the constraining layer from the dissipating layer (e.g., see FIG. 8). In such an embodiment, the kinetic spacer layer (i.e., its base layer or spacer elements) can be attached to the constraining layer, e.g., by some heat or friction fusing operation and/or with an additional adhesive layer. This additional adhesive layer could, for example, be any kind of adhesive layer that does not provide any or only little viscoelastic properties, such as for example an epoxy resin. It is also possible to have an embodiment of a multilayer damping material according to the invention, where the kinetic spacer layer is directly bonded (e.g., by mechanical fasteners, fusing or with an adhesive) to the surface to be damped and the dissipating layer is arranged between the spacer layer and the constraining layer (e.g., see FIG. 9). Again, the kinetic spacer layer (i.e., its base layer or spacer elements) could be attached to the surface to be damped, e.g., by some heat or friction fusing operation and/or with an additional adhesive layer. This additional adhesive layer could, for example, be any kind of adhesive layer that does not provide any or only little viscoelastic properties, such as for example a typical epoxy resin.

According to one other exemplary embodiment of the invention, the dissipating layer may be arranged so as to separate the constraining layer from the kinetic spacer layer. In this embodiment, the dissipating layer can be a viscoelastic adhesive layer that bonds the kinetic spacer layer and constraining layer together.

According to another exemplary embodiment of the invention, the dissipating layer may be chosen so that 0 up to 100% of the spacer elements are embedded in the dissipating layer. For example, the end of the spacer elements may only contact the dissipating layer (i.e., 0% embedded) or the dissipating layer could be a foam that completely surrounds or otherwise fills the space between the spacer elements (i.e., 100% embedded). When the spacer elements are not 100% embedded in the dissipating layer, the remaining space between the spacer elements could be filled with an additional damping or thermal insulating material and/or with an alternative material that provides other properties to the kinetic spacer layer.

According to one exemplary embodiment of the invention, the kinetic spacer elements may be arranged equally spaced apart from each other within the kinetic spacer layer. Being equally spaced apart from each other may mean that each and every spacer elements comprises the same distance to the adjacent spacer element or elements. One example of such equally spaced apart kinetic spacer elements are spacer elements that are arranged in rows and columns, wherein the rows and columns are equally spaced apart from each other.

According to another exemplary embodiment of the invention, the kinetic spacer elements may be are arranged homogeneously or uniformly at locations within the kinetic spacer layer. Being arranged homogeneously or uniformly at locations within the kinetic spacer layer may mean that the kinetic spacer elements are arranged within a pattern, wherein the pattern is repeated over and over again within the kinetic spacer layer. The kinetic spacer elements within the pattern may or may not be equally spaced apart from each other.

According to another exemplary embodiment of the invention, the kinetic spacer elements may be arranged in-homogeneously or non-uniformly at locations within the kinetic spacer layer. This embodiment provides kinetic spacer elements that are randomly arranged within the kinetic spacer layer. There may for example be areas, where the kinetic spacer elements are equally spaced apart from each other, as well as areas where they are not equally spaced apart from each other.

According to yet another exemplary embodiment of the invention, the kinetic spacer elements may be uniformly shaped and sized, which means that all kinetic spacer elements or all groups of kinetic spacer elements have the same shape and the same size. It is also possible that the kinetic spacer elements are non-uniformly shaped and sized. For example, it is possible that all the kinetic spacer elements within one kinetic spacer layer comprise a different shape and/or a different size than all other kinetic spacer elements within this one kinetic spacer layer. It is also possible that some of the shapes and/or sizes of the kinetic spacer elements repeat within one kinetic spacer layer.

According to another exemplary embodiment of the invention, the kinetic spacer elements may have any kind of suitable shape, such as for example the shape of a cylinder, a pyramid, a barrel and/or they may be spherically shaped. The kinetic spacer elements of the above mentioned shapes or of any other shape may be hollow or solid. The kinetic spacer elements may have a cross-sectional area that is round, oblong, polygonal, or a combination of the mentioned cross sectional area geometry. The spacer elements may be in the form of stems that are tapered on both sides (e.g., convexly like a barrel or concavely like the figure "8"). The kinetic spacer elements may also have concave portions. The kinetic spacer elements may contain void areas— for example locally via gas bubbles or glass bubbles or regionally via design, e.g. being hollow, pipes or tubes as mentioned above. They may comprise walls and a core out of a different materials. The walls may for example be harder and/or stronger than the core. The kinetic spacer elements may also comprise large glass beads or bubbles, instead of being stem shaped. The spacer elements may also comprise grains of sand, e.g., as a filler. The spacer elements may be made out of plastic or ceramic materials and possibly metals. The spacer elements may comprise polymer pellets. The spacer elements may also comprise fibers that are loosely or tightly packed such as, e.g., the fibrous structure sold under the name of Brushlon™ by 3M Company. In addition, the spacer elements may be spread apart so as not to contact each other or packed tightly together so that most or all of the spacer elements are in contact with adjacent spacer elements.

The vertical axis of the kinetic spacer elements (i.e., in the thickness direction of the kinetic spacer layer) may be arranged perpendicular (90°) to the plane of the dissipating layer. It is of course also possible for the vertical axis of the kinetic spacer elements to be tilted at an angle in the range of from about 25° up to about 90° relative to the plain of the dissipating layer. The vertical axis of one or more or all of the kinetic spacer elements can also be tilted all in the same direction, in a pattern (e.g., see FIG. 26) or in random directions (e.g., see FIG. 27).

It can be desirable for each free end of one or most or all of the kinetic spacer elements to be formed with a flat surface or cap to maximize the surface area of the spacer element end in contact with, and/or for bonding with, a dissipating layer, base layer and/or constraining layer. The caps may not be as wide as the rest of the spacer element, but in order to increase the contact surface area of the spacer element ends, it can be preferable for caps to be flared outwardly so as to have a greater surface area (see, e.g., FIGS. 14A-14C and 16). It can also be preferable for the plane of the flat or capped end of the kinetic spacer element to be generally perpendicular to its longitudinal axis. Thus, a kinetic spacer element according to the invention may also comprise at least one cap on at least one end, e.g. the end facing the constraining layer and/or the end facing the vibration surface. The kinetic spacer element may also comprise two caps, one on each end of the kinetic spacer element. It is also possible that multiple (more than one) kinetic spacer elements are connected to at least one common cap. It is also possible that multiple (more than one) kinetic spacer elements are connected to two common caps, one on each end of the kinetic spacer elements. The common caps on both ends of the kinetic spacer elements may connect different kinetic spacer elements on the top as on the bottom or they may connect the same kinetic spacer elements on both sides. All the above mentioned embodiments and examples may be combined with each other.

According to another embodiment of the invention, the kinetic spacer elements may comprise the shape of an I-beam, X-beam or an H-beam. The various lines of the letters could also be curved. For further examples please see the description of the Figures. The spacer elements with the above describes shapes could be arranged such as to be seen from a side view or also from a top view.

According to another embodiment of the invention, the multilayer damping material comprises a base layer, wherein the kinetic spacer elements extend out of the base layer. The base layer may comprise the function of a support layer for the kinetic spacer elements. The base layer may be made out of the same material as the kinetic spacer elements. Such an embodiment provides the advantage of being able to make the base and the kinetic spacer layer within one production step, which saves time and costs. One possible way of making such kinetic spacer elements is micro-replication technology, rapid prototyping or additive manufacturing. Other ways of manufacturing the kinetic spacer layer and the kinetic spacer elements are molding, embossing, or corrugating. It is also possible that the base layer and the kinetic spacer layer with the kinetic spacer elements are made out of different materials.

According to another embodiment of the invention, the kinetic spacer elements are an integral part of the base layer. The kinetic spacer elements may be for example be formed together within one production step or they may be bonded to the base layer within a separate production step.

Generally all known materials are possible for making the kinetic spacer elements. According to one embodiment of the invention, the kinetic spacer elements may comprise at least one of the following materials: ceramic, glass, metal such as for example aluminium, carbon, clay, foamed PU, plastics such as for example thermoplastic materials such as for example polyester, polypropylene, polyethylene, acrylonitrile butadiene styrene (ABS), nylon. The base layer may be made out of a different material than the kinetic spacer elements as well.

The kinetic spacer elements may comprise any combination of the materials listed above. It is also possible that some of the kinetic spacer elements are comprised of different chemical compositions then the other kinetic spacer elements.

The kinetic spacer elements may also comprise the shape and size of fibers. One example of fibers as a kinetic spacer element are nylon fibers such as for example Brushlon™ fibers, commercially available from 3M Company, Minn., USA.

According to another embodiment of the invention, the kinetic spacer elements may comprise more than one material. They may comprise any combination of the above mentioned list of materials. The materials described above may be formulated into a master batch having the desired properties. Another example of a multi-material kinetic spacer element according to the invention may be a spacer element comprising a stem out of one material and a thin layer of another material at one and/or two ends thereof. The material of the thin layer may for example be a viscoelastic material capable of dissipating energy. The thickness of the thin layer may for example be 3 µm. The kinetic spacer elements may also provide a sheath/core composition, meaning that the core of the kinetic spacer elements have a different composition than the sheath of the kinetic spacer element. The kinetic spacer elements may also provide a layered construction wherein the layers may comprise different materials. It is possible that the kinetic spacer elements provide two or more different materials in each of the above described embodiments. The kinetic spacer elements may also comprise glass bubbles integrated into the construction of the elements.

The kinetic spacer elements may—driven by the needs of the customer—comprise a height in the range of from about 0.1 mm up to about 15 mm.

According to another embodiment of the invention the base layer may comprise at least one of the following materials: acrylate, polypropylene, polyester. The base layer may also comprise a combination of the mentioned materials The base layer may comprise a thickness within the range of from 0.0 mm (no base layer present) up to about 3 mm.

The ratio of the height of the kinetic spacer elements (i.e., in the thickness direction of the kinetic spacer layer) to the height, or thickness, of the base material may be for example greater than 1.1/1, greater than 10/1 and greater than 20/1. It is desirable for the kinetic spacer elements to have a taller than they are wide so that the at least one end of each spacer element, which is embedded in, bonded to, in contact with, or in close proximity to the dissipating layer, can move so as to interact with the dissipating layer such that energy is dissipated within the multilayer material. It can be desirable for each kinetic spacer element to have a height/width aspect ratio in the range of from greater than about 0.3:1 up to and including about 20:1. In general, the performance of the kinetic spacer layer can decrease as the height/width ratio of the spacer elements increases, the performance can increase as the height/width ratio of the spacer elements decreases.

According to another embodiment of the invention, when the kinetic spacer layer includes a base layer, the base layer may comprise a netting or a film. An example of a perforated film structure or a netting structure that may be useful as such a kinetic spacer layer can be found in U.S. Pat. No. 8,889,243, which is incorporated herein by reference in its entirety. The netting or the film may be embedded into a material, such as a matrix material. But it is also possible that the base layer only comprises the netting or the film. The netting or the film may be spread within the entire base layer or it may be arranged in certain areas only. The base layer may also comprise a nonwoven material.

According to another embodiment, when it has one, the base layer of kinetic spacer layer may comprise apertures and/or slits. Such an embodiment may be optimized regarding weight, since it may comprise less material than a multilayer damping material with a base layer without apertures and/or slits. If the base layer comprises a netting or a film with apertures, the apertures may be the apertures of the netting or the film. The kinetic spacer elements may be arranged between the apertures. It is also possible, that the kinetic spacer elements cover the apertures or slits of the base layer at least partially.

According to another embodiment of the invention, the dissipating layer of the multilayer damping material may comprise apertures and/or slits. The dissipating layer may also comprise spots, blotches and/or islands. The invention also covers embodiments, where the dissipating layer only comprises a little island on the end of each of the kinetic spacer elements (i.e., being about the same size or smaller than the spacer element end), where they contact their adjacent layer, e.g. the constraining layer or the vibrating surface. This embodiment may be optimized regarding weight, since it may comprise less material than a multilayer damping material with a dissipating layer without apertures or slits or being in the form of spots, blotches and/or islands.

According to another embodiment of the invention, the constraining layer may comprise apertures and/or slits which again provides a potential for weight savings. The constraining layer may be continuously or discontinuously in contact with a dissipating layer. The constraining layer may be arranged adjacent to and in contact with a dissipating layer.

The constraining layer may be arranged on the opposite side of the dissipating layer as the kinetic spacer layer (e.g., see FIG. 9). The constraining layer can provide the advantage of additionally introducing a shear within the dissipating layer which can lead to a more effective damping. It is also possible that the constraining layer itself is continuous or discontinuous.

ADDITIONAL EMBODIMENTS

1. A multilayer material for stiffening a substrate and/or damping a vibrating surface of a substrate, when the multilayer material is bonded, mechanically fastened or otherwise secured to the surface of the substrate. The multilayer material comprises: at least one constraining layer; at least one dissipating layer; and at least one kinetic spacer layer comprising multiple spacer elements, the kinetic spacer layer being arranged between the constraining layer and the vibrating surface, when used for stiffening the substrate and/or damping the vibrating surface. Each spacer element has opposite ends. At least one end of each of the multiple spacer elements is embedded in, bonded to, in contact with, or in close proximity to the dissipating layer. When the multilayer material is used for damping, at least in part, the at least one end of each spacer element interacts with the dissipating layer such that energy is dissipated within the multilayer material through movement of the at least one end of each of the multiple spacer elements.
2. The multilayer damping and/or stiffening material according to embodiment 1, wherein the kinetic spacer elements are arranged so as to separate the constraining layer from the dissipating layer.
3. The multilayer damping and/or stiffening material according to embodiment 1 or 2, wherein the dissipating layer is arranged so as to separate the constraining layer from the kinetic spacer layer.
4. The multilayer damping and/or stiffening material according to any of the preceding embodiments, wherein the spacer elements contact the dissipating layer such that 0 to 100% of the spacer elements are embedded in the dissipating layer.
5. The multilayer damping and/or stiffening material according to any of the preceding embodiments, wherein the kinetic spacer elements are arranged equally spaced apart from each other within the kinetic spacer layer.
6. The multilayer damping and/or stiffening material according to any one of the preceding embodiments, wherein the kinetic spacer elements are arranged homogeneously or uniformly at locations within the kinetic spacer layer.
7. The multilayer damping and/or stiffening material according to any one of the preceding embodiments, wherein the kinetic spacer elements are arranged in-homogeneously or non-uniformly at locations within the kinetic spacer layer.
8. The multilayer damping and/or stiffening material according to any one of the preceding embodiments, wherein the kinetic spacer elements are uniformly shaped and sized.
9. The multilayer damping and/or stiffening material according to any one of the preceding embodiments, wherein the kinetic spacer elements are non-uniformly shaped and sized.
10. The multilayer damping and/or stiffening material according to any one of the preceding embodiments, wherein the kinetic spacer elements are cylindrical, pyramidal, barrel or spherical shaped.
11. The multilayer damping and/or stiffening material according to any one of the preceding embodiments, comprising a base layer, wherein the kinetic spacer elements extend out of the base layer.
12. The multilayer damping and/or stiffening material according to any one of the preceding embodiments, wherein the base layer is made out of the same material as the kinetic spacer elements.
13. The multilayer damping and/or stiffening material according to any one of the preceding embodiments, wherein each of the kinetic spacer elements is an integral part of the base layer (e.g., formed together as one part, or bonded together).
14. The multilayer damping and/or stiffening material according to any one of the preceding embodiments, wherein the base layer is made out of a different material than the kinetic spacer elements.
15. The multilayer damping and/or stiffening material according to any one of the preceding embodiments, wherein the kinetic spacer elements may comprise at least one of the following materials: ceramic, glass, metal such as for example aluminium, carbon, clay, foamed PU, plastics such as for example polyester, polypropylene, polyethylene, acrylonitrile butadiene styrene (ABS), nylon.
16. The multilayer damping and/or stiffening material according to embodiment 11, wherein the kinetic spacer elements may comprise any combination of the materials listed.
17. The multilayer damping and/or stiffening material according to any one of the preceding embodiments, wherein the base layer may comprise at least one of the following materials: acrylate, polypropylene, polyester.
18. The multilayer damping and/or stiffening material according to any one of the preceding embodiments, wherein the base layer comprises a thickness within the range of from 0 mm (no base layer present) up to about 3 mm.
19. The multilayer damping and/or stiffening material according to any one of the preceding embodiments, wherein the base layer comprises a netting, nonwoven and/or a film.
20. The multilayer damping and/or stiffening material according to any one of the preceding embodiments, wherein the base layer comprises apertures and/or slits.
21. The multilayer damping and/or stiffening material according to any one of the preceding embodiments, wherein the base layer is continuous or discontinuous.
22. The multilayer damping and/or stiffening material according to any one of the preceding embodiments, wherein the dissipating layer is continuous or discontinuous.
23. The multilayer damping and/or stiffening material according to any one of the preceding embodiments, wherein the dissipating layer is discontinuous and located only on the one end of the multiple spacer elements.
24. The multilayer damping and/or stiffening material according to any one of the preceding embodiments, wherein the dissipating layer comprises apertures and/or slits.
25. The multilayer damping and/or stiffening material according to any one of the preceding embodiments, wherein the constraining layer comprises apertures and/or slits.
26. The multilayer damping and/or stiffening material according to any of the preceding embodiments, wherein the constraining layer is continuous or discontinuous.

27. The multilayer damping and/or stiffening material according to any one of the preceding embodiments, wherein the constraining layer is arranged adjacent to, and in contact with the dissipating layer or another dissipating layer.
28. The multilayer damping and/or stiffening material according to any one of the embodiments 18 to 21, wherein the constraining layer is continuously or discontinuously in contact with the dissipating layer or another dissipating layer.
29. The multilayer damping and/or stiffening material according to any one of the preceding embodiments in a form suitable (i.e., dimensioned, designed and/or configured) for use in damping vibration and/or noise within a vehicle such as for example an automobile, truck, aircraft, train, ship, vessel or boat.
30. The multilayer damping and/or stiffening material according to any one of the preceding embodiments in a form suitable (i.e., dimensioned, designed and/or configured) for use in damping vibration and/or noise within an appliance such as for example a washing machine, a dish washer etc.
31. The multilayer damping and/or stiffening material according to any one of the preceding embodiments in a form suitable (i.e., dimensioned, designed and/or configures) for use in a damping vibration and/or noise within any other machine or system comprising a machine such as for example a generator system, elevator or air handling system.
32. The multilayer damping and/or stiffening material according to any one of the preceding embodiments, wherein only one end of each of the multiple spacer elements is embedded in, bonded to, in contact with, or in close proximity to the dissipating layer so as to allow the one end of each of the multiple spacer elements to move.
33. The multilayer damping and/or stiffening material according to any one of the preceding embodiments, wherein the at least one end of each of the multiple spacer elements is embedded in, bonded to, in contact with, or in close proximity to the dissipating layer such that, through movement of the at least one end of each of the multiple spacer elements, strain and/or deformation is caused in the dissipating layer, resulting in energy being dissipated within the dissipating layer.
34. A vehicle component (e.g., an automobile component) comprising a multilayer damping and/or stiffening material according to any one of the preceding embodiments. The vehicle component comprising this multilayer damping and/or stiffening material may for example be any part of the entire body of the vehicle. It might for example be useful to place the multilayer damping and/or stiffening material according to the invention in a close proximity to a vibration source such as, for example, an engine of a vehicle.
35. A vehicle component according to embodiment 34, wherein the vehicle is an automobile, and the component is a car roof, door panel, front-of-dash (e.g., dashboards), or floor panel.

Embodiments of the present invention are further illustrated by the following examples, but the particular materials and amounts thereof recited in these examples, as well as other conditions and details, should not be construed to unduly limit this disclosure.

EXAMPLES

The effect of stand-off damping using a kinetic spacer layer comprising multiple spacer elements according to the claims has been demonstrated with 3 different structures as kinetic spacer layer in two orientations.

Sample Preparation:

FIGS. 3 and 4 show the principle structure of the samples and the orientation of the different layers. The kinetic spacer elements are either extending from the base layer 2a into the direction of the panel 10 (pins down) or they are facing into the direction away from the panel 10 (pins up). Details of the materials used for the samples are shown in table 1. For the tests the panel 10 of FIGS. 3 and 4 is replaced by a below described steel beam for Oberst measurement.

Three different kinetic spacer layers were tested as well as a commercially available damping material.

Samples A-1 and A-2

A web made as described in U.S. Pat. No. 5,792,411 that comprises cylindrical stem elements that have a diameter of about 0.76 mm that are spaced apart from each other approximately 1.35 mm. They are about 0.44 mm tall with a base layer thickness of about 0.12 mm. They are made from a polypropylene resin.

Samples B-1 and B-2

Pattern #1 comprises cylindrical elements as shown in FIGS. 16 and 17 that have a diameter of about 0.96 mm and a cap diameter of about 1.1 mm. They are spaced apart from each other approximately 1.3 mm. They are about 2.11 mm tall with a web thickness of about 0.51 mm. They are made from a DS Accura 60 resin.

Samples C-1 and C-2

Pattern #2 comprises cylindrical elements as shown in FIGS. 16 and 17 that have a diameter of about 1.23 mm and a cap diameter of about 1.67 mm. They are spaced apart from each other approximately 2.25 mm. They are about 2.07 mm tall with a web thickness of about 0.51 mm. They are made from a DS Accura 60 resin.

As comparative sample 3M™ Vibration Tape CL 1151 (commercially available from 3M Germany, Neuss, Germany) was used. It is a constrained layer damper material with a constraining layer and a dissipating layer, with the materials listed in table 1.

The samples were prepared by manual lamination of the different layers, starting with the constraining layer 4 and the dissipating layer 3 and then adding the kinetic spacer layer 2 and the further dissipating layer 1. After measurement of weight and thickness, the samples were laminated to a test panel (steel: 1 mm thick; area: 10 mm×240 mm; covered area: 10 mm×210 mm).

Example Measurement

The damping behaviour of the examples was measured using the Oberst method according to DIN 53440 and ISO 5721. Using this method, the damping performance is determined by vibrational excitation of a steel beam covered with damping material and clamped at the uncovered end. The system damping loss factor can be calculated from the shape and width of so called transfer functions at bending resonance modes.

The measurements were performed in an environmental chamber at temperatures between 0° C. and 60° C. with a temperature increment of 20° C.

Figure 20:
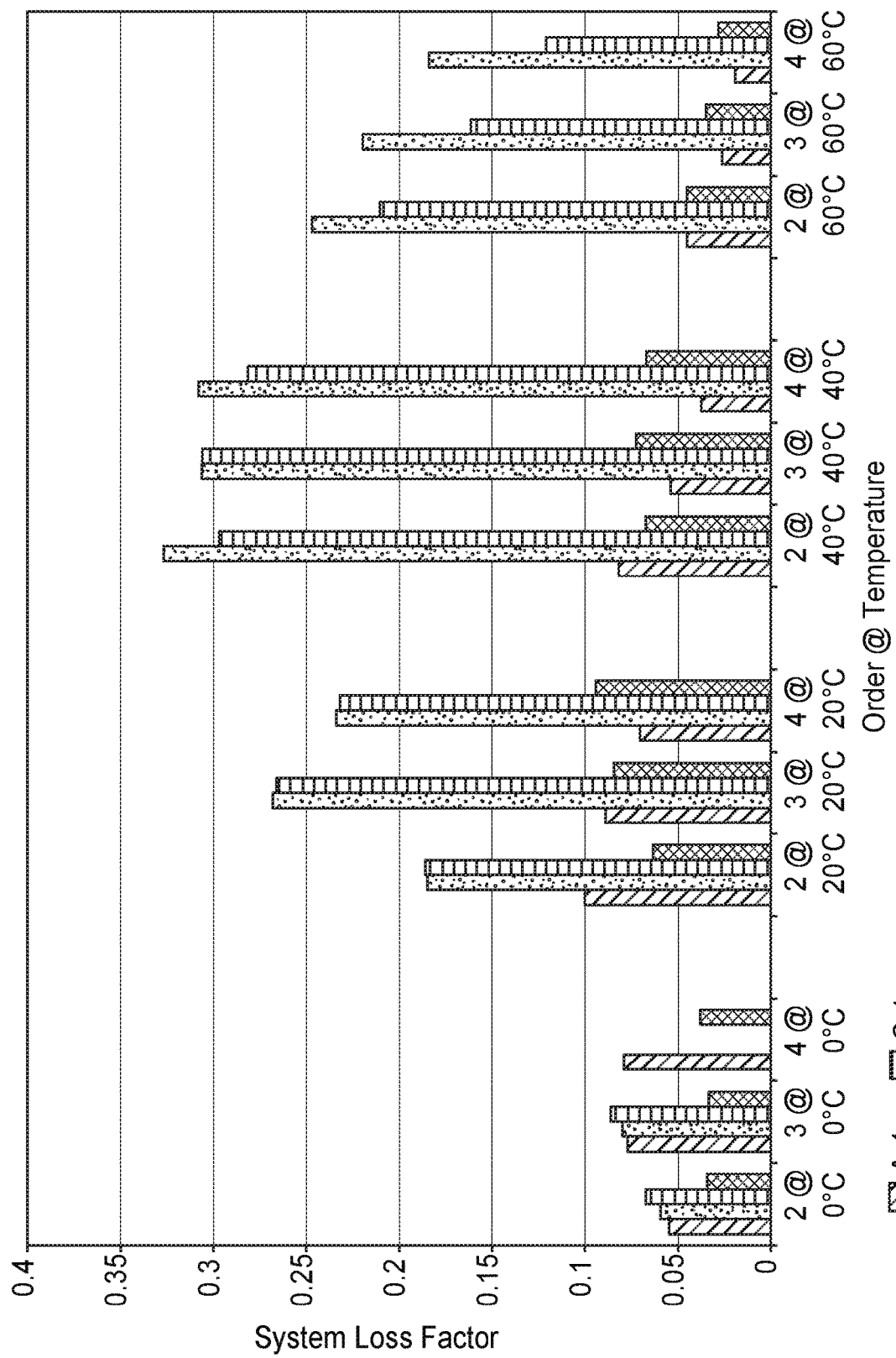
FIG. 20 is a diagram showing the damping performance of different multilayer damping materials according to the invention in comparison to a commercially available product (pins-up)
Figure 21:
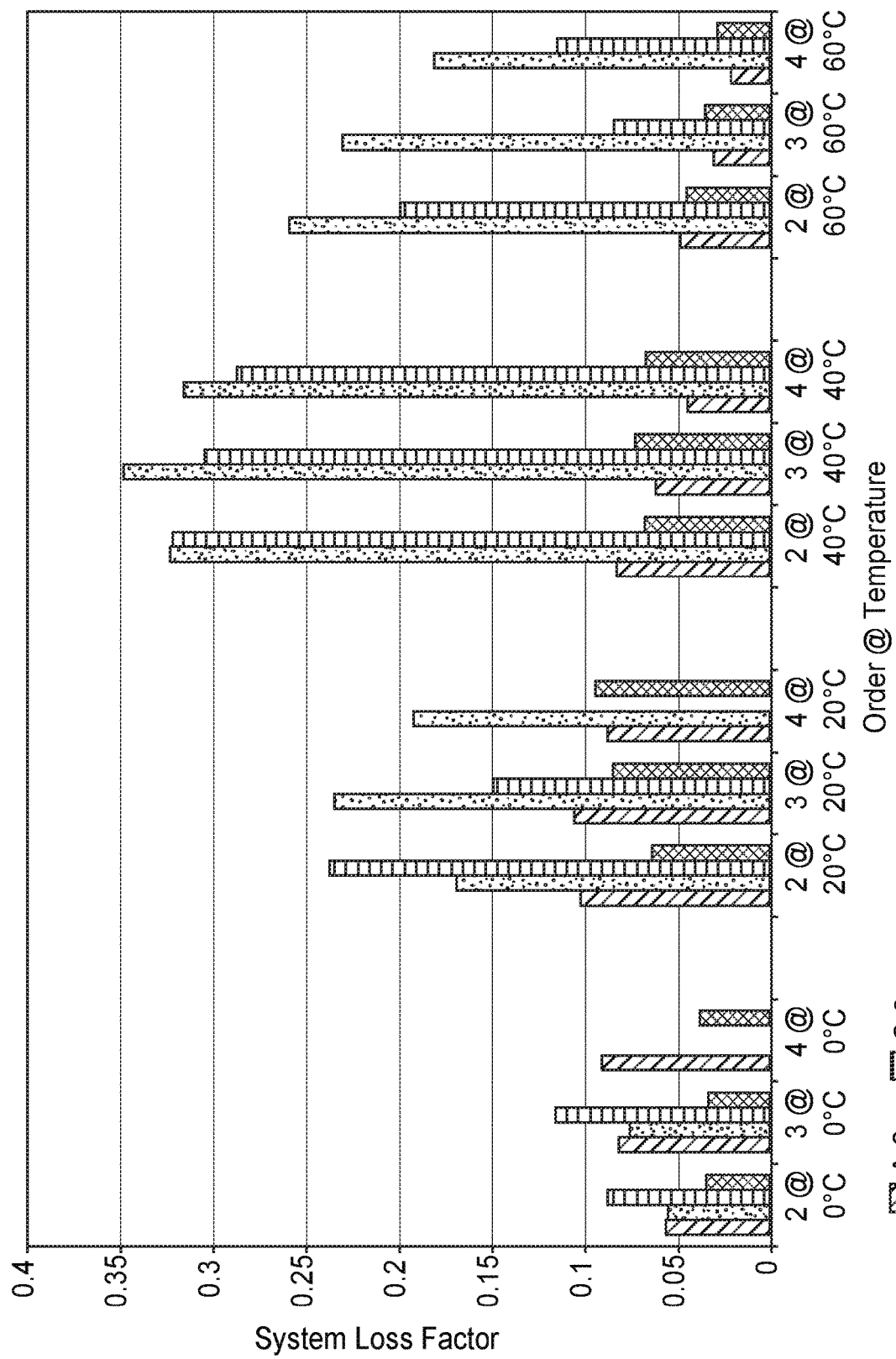
FIG. 21 is a diagram showing the damping performance of different multilayer damping materials according to the invention in comparison to a commercially available product (pins-down)

The results are shown in FIGS. 20 (pins up) and 21 (pins down). The damping performance at the bending resonance orders 2, 3, and 4 is plotted for the mentioned evaluation temperatures. Although having a lower weight/area, the damping loss factor of sample A is equal or higher compared with the commercial 3M Vibration Control Tape CL1151. Samples B and C show a much bigger damping performance compared with CL1151 which clearly demonstrates the suitability of the new structure according to the invention for damping application. The orientation of the stand-off layer can have a minor influence on the loss factor of the sample material.

| | Sample: | | | | | | |
|---|---|---|---|---|---|---|---|
| | A-1 | A-2 | B-1 | B-2 | C-1 | C-2 | 3M Vibration Control Tape CL1151 |
| Layer 1 | 3M acrylic damping adhesive (from commercial 3M Vibration Control Tape CL1151) | 3M acrylic damping adhesive (from commercial 3M Vibration Control Tape CL1151) | 3M acrylic damping adhesive (from commercial 3M Vibration Control Tape CL1151) | 3M acrylic damping adhesive (from commercial 3M Vibration Control Tape CL1151) | 3M acrylic damping adhesive (from commercial 3M Vibration Control Tape CL1151) | 3M acrylic damping adhesive (from commercial 3M Vibration Control Tape CL1151) | — |
| Layer 2 | Stem Web, Polypropylene, Pins up | Stem Web, Polypropylene, Pins down | Rapid prototype sample from 3D printer, Resin: Accura 60, pattern #1, Pins up | Rapid prototype sample from 3D printer, Resin: Accura 60, pattern #1, Pins down | Rapid prototype sample from 3D printer, Resin: Accura 60, pattern #2, Pins up | Rapid prototype sample from 3D printer, Resin: Accura 60, pattern #2, Pins down | |
| Layer 3 | 3M acrylic damping adhesive (from commercial 3M Vibration Control Tape CL1151) | 3M acrylic damping adhesive (from commercial 3M Vibration Control Tape CL1151) | 3M acrylic damping adhesive (from commercial 3M Vibration Control Tape CL1151) | 3M acrylic damping adhesive (from commercial 3M Vibration Control Tape CL1151) | 3M acrylic damping adhesive (from commercial 3M Vibration Control Tape CL1151) | 3M acrylic damping adhesive (from commercial 3M Vibration Control Tape CL1151) | 3M acrylic damping adhesive (from commercial 3M Vibration Control Tape CL1151) |
| Layer 4 | Aluminum (125 μm) | Aluminum (125 μm) | Aluminum (125 μm) | Aluminum (125 μm) | Aluminum (125 μm) | Aluminum (125 μm) | Aluminum (250 μm) |
| Total Thickness: | 1.02 mm | 1.02 mm | 3.00 mm | 3.00 mm | 2.95 mm | 2.95 mm | 0.38 mm |
| Weight/area: | 0.79 kg/m$^2$ | 0.71 kg/m$^2$ | 2.46 kg/m$^2$ | 2.43 kg/m$^2$ | 1.74 kg/m$^2$ | 1.84 kg/m$^2$ | 0.83 kg/m$^2$ |

The invention claimed is:

1. A multilayer damping material for damping a vibrating surface comprising:
   at least one constraining layer;
   at least one dissipating layer made of a viscoelastic material, wherein the at least one constraining layer is less elastic than the dissipating layer; and
   at least one kinetic spacer layer comprising multiple spacer elements that are spaced apart and mutually disconnected from each other within the kinetic spacer layer, the kinetic spacer layer being arranged between the constraining layer and the vibrating surface, when used for damping the vibrating surface,
   wherein each spacer element is a solid spacer element that has opposite ends, and only one end of each of the multiple spacer elements embedded in, bonded to, in contact with, or in close proximity to the dissipating layer, such that energy is dissipated within the multilayer damping material, through movement of the end of each of the multiple spacer elements.

2. The multilayer damping material according to claim 1, wherein the kinetic spacer elements are arranged so as to separate the constraining layer from the dissipating layer, or the dissipating layer is arranged so as to separate the constraining layer from the kinetic spacer layer.

3. The multilayer damping material according to claim 1, wherein the spacer elements contact the dissipating layer such that at least some of the spacer elements are embedded in the dissipating layer.

4. The multilayer damping material according to claim 1, wherein the kinetic spacer elements are arranged (a) equally spaced apart from each other within the kinetic spacer layer, or (b) homogeneously or uniformly at locations within the kinetic spacer layer.

5. The multilayer damping material according to claim 1, wherein the kinetic spacer elements are cylindrical, pyramidal, barrel or spherical shaped.

6. The multilayer damping material according to claim 1, comprising a base layer, wherein the kinetic spacer elements extend out of the base layer.

7. The multilayer damping material according to claim 6, wherein the base layer is made out of the same material as the kinetic spacer elements.

8. The multilayer damping material according to claim 6, wherein the base layer comprises apertures and/or slits.

9. The multilayer damping material according to claim 6, wherein the base layer comprises at least one of the following materials: acrylate, polypropylene, and/or polyester.

10. The multilayer damping material according to claim 1, wherein the dissipating layer is discontinuous and located only on the one end of the multiple spacer elements.

11. The multilayer damping material according to claim 1, wherein the constraining layer is arranged adjacent to, and in contact with the dissipating layer or another dissipating layer.

12. The multilayer damping material according to claim 1, in a form suitable for use in damping vibration and/or noise within (a) a vehicle, (b) an appliance, (c) any other machine or system comprising a machine, or (d) any combination of (a), (b) and (c).

13. The multilayer damping material according to claim 1, wherein only one end of each of the multiple spacer elements is embedded in, bonded to, in contact with, or in close proximity to the dissipating layer so as to allow the one end of each of the multiple spacer elements to move.

14. An automobile component comprising the multilayer damping material according to claim 1.

15. The automobile component according to claim 14, wherein the component is a car roof, door panel, front-of-dash, or floor panel.

16. The multilayer damping material according to claim 1, wherein the kinetic spacer elements comprise at least one of the following materials: ceramic, glass, metal, carbon, clay, foamed PU, polyester, polypropylene, polyethylene, acrylonitrile butadiene styrene (ABS), and/or nylon.

17. The multilayer damping material according to claim 1, wherein the kinetic spacer elements are taller than they are wide.

* * * * *